(12) United States Patent
Shim et al.

(10) Patent No.: US 12,379,578 B2
(45) Date of Patent: Aug. 5, 2025

(54) OPTICAL SYSTEM AND CAMERA MODULE INCLUDING SAME

(71) Applicant: LG INNOTEK CO., LTD., Seoul (KR)

(72) Inventors: Ju Yong Shim, Seoul (KR); Tae Kyung Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 288 days.

(21) Appl. No.: 17/915,962

(22) PCT Filed: Mar. 30, 2021

(86) PCT No.: PCT/KR2021/003934
§ 371 (c)(1),
(2) Date: Sep. 29, 2022

(87) PCT Pub. No.: WO2021/201568
PCT Pub. Date: Oct. 7, 2021

(65) Prior Publication Data
US 2023/0116562 A1  Apr. 13, 2023

(30) Foreign Application Priority Data
Mar. 30, 2020 (KR) .................. 10-2020-0038383

(51) Int. Cl.
*G02B 15/14* (2006.01)
*G02B 13/00* (2006.01)
(Continued)

(52) U.S. Cl.
CPC ....... *G02B 15/144* (2019.08); *G02B 13/0045* (2013.01); *G02B 13/009* (2013.01); *G02B 15/20* (2013.01); *G02B 15/167* (2013.01)

(58) Field of Classification Search
CPC .... G02B 9/64; G02B 13/0045; G02B 13/009; G02B 15/20; G02B 15/144; G02B 15/163; G02B 15/167
(Continued)

(56) References Cited

U.S. PATENT DOCUMENTS 5,448,412 A  9/1995  Maruyama et al.
5,671,062 A  9/1997  Nakamura
(Continued)

FOREIGN PATENT DOCUMENTS

EP  1965241 A1 * 9/2008 ........... G02B 15/173
JP  5-323196 A  12/1993
(Continued)

OTHER PUBLICATIONS

Rudolf Kingslake and R. Barry Johnson, Lens Design Fundamentals, 2010, Academic Press, 2nd Edition, p. 16 (Year: 2010).*
(Continued)

*Primary Examiner* — Nicholas R. Pasko
*Assistant Examiner* — Alex Park Rickel
(74) *Attorney, Agent, or Firm* — Birch, Stewart, Kolasch & Birch, LLP

(57) ABSTRACT

A zoom optical system according to an embodiment of the present invention comprises a first lens group, a second lens group, a third lens group, and a fourth lens group which are successively arranged from an object side to an image side, wherein the first lens group to the fourth lens group each comprise two lenses, wherein the second lens group and the third lens group are movable, and wherein the telephoto effective focal length (EFL) is defined by the mathematical expression below:
(Continued)

$$9.0 < \frac{EFL_{tele}}{H_{imageD}} < 9.5$$

where, $EFL_{tele}$ refers to the effective focal length of the zoom optical system in the telephoto, and $H_{imageD}$ refers to a value of half a diagonal length of an image sensor pixel area.

16 Claims, 17 Drawing Sheets

(51) Int. Cl.
  *G02B 15/20* (2006.01)
  *G02B 15/167* (2006.01)
(58) Field of Classification Search
  USPC .................................................. 359/676, 686
  See application file for complete search history.

(56) References Cited

U.S. PATENT DOCUMENTS

| 8,320,051 | B2* | 11/2012 | Matsumura | G02B 13/18 |
| | | | | 359/686 |
| 8,441,739 | B2 | 5/2013 | Yamaguchi | |
| 10,983,331 | B2 | 4/2021 | Kishi | |
| 2009/0141365 | A1 | 6/2009 | Jannard et al. | |
| 2011/0058261 | A1 | 3/2011 | Kakimoto | |
| 2011/0228407 | A1* | 9/2011 | Yamaguchi | G02B 15/144113 |
| | | | | 359/687 |
| 2015/0109485 | A1* | 4/2015 | Ozaki | G02B 27/646 |
| | | | | 359/557 |
| 2015/0130961 | A1 | 5/2015 | Sudoh | |
| 2018/0081156 | A1* | 3/2018 | Suzuki | H04N 23/69 |
| 2019/0004277 | A1* | 1/2019 | Iwamoto | G02B 13/22 |
| 2019/0361153 | A1 | 11/2019 | Wang et al. | |
| 2021/0080706 | A1* | 3/2021 | Lin | G02B 13/0065 |

FOREIGN PATENT DOCUMENTS

| JP | 2010-60919 A | 3/2010 |
| JP | 2011-197302 A | 10/2011 |
| JP | 2012-141600 A | 7/2012 |
| JP | 2015-84030 A | 4/2015 |
| KR | 10-1992-0022034 A | 12/1992 |
| KR | 10-2010-0082785 A | 7/2010 |
| KR | 10-2011-0027122 A | 3/2011 |
| KR | 10-2019-0107679 A | 9/2019 |
| WO | WO 2019/012794 A1 | 1/2019 |

OTHER PUBLICATIONS

Partial Supplementary European Search Report for European Application No. 21779088.0, dated Mar. 25, 2024.

* cited by examiner

[FIG. 1]
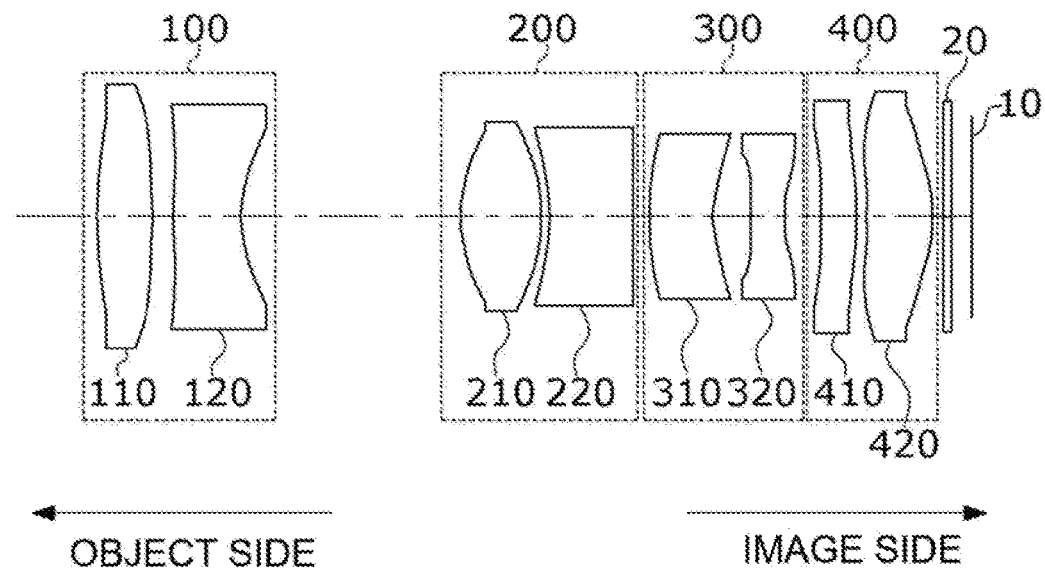
[FIG. 2A]
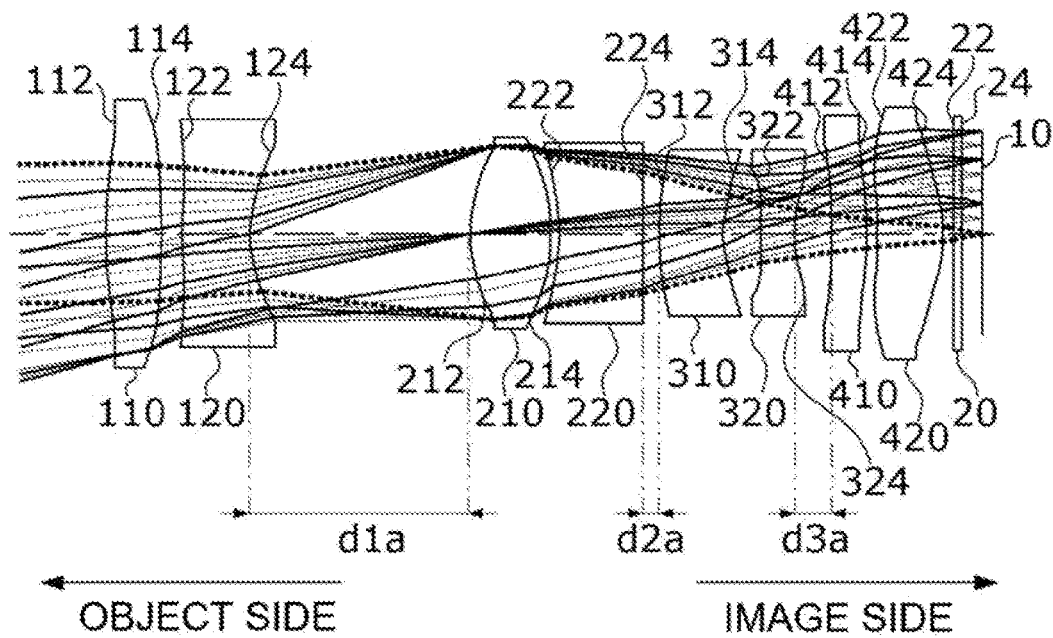

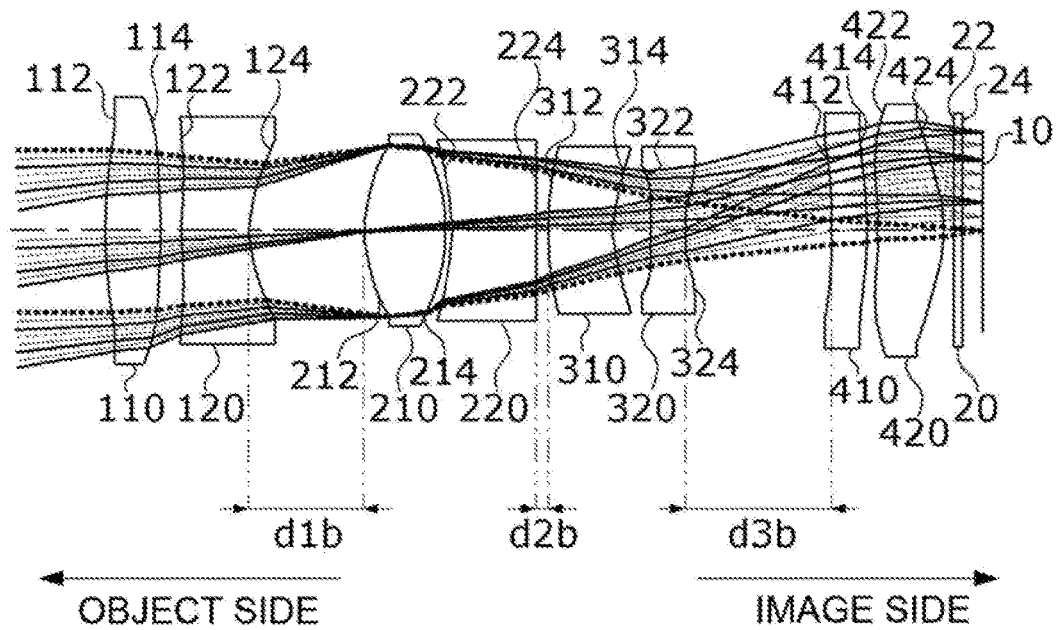
[FIG. 2B]
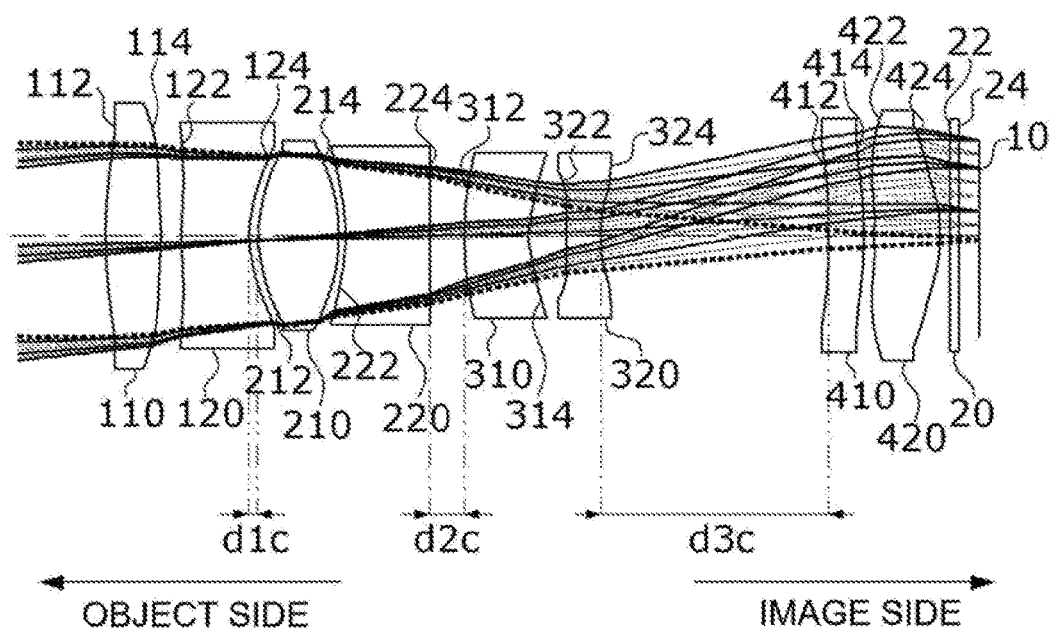
[FIG. 2C]

[FIG. 3A]
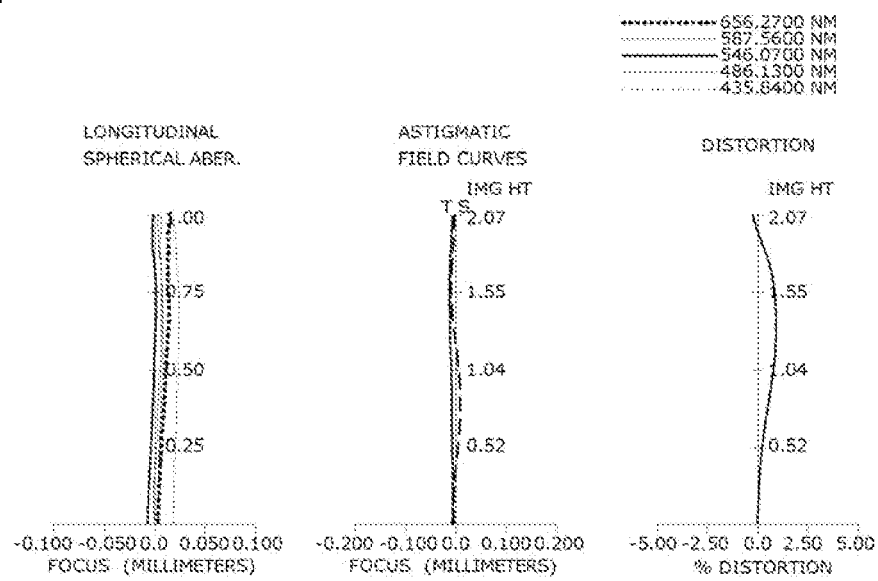
[FIG. 3B]
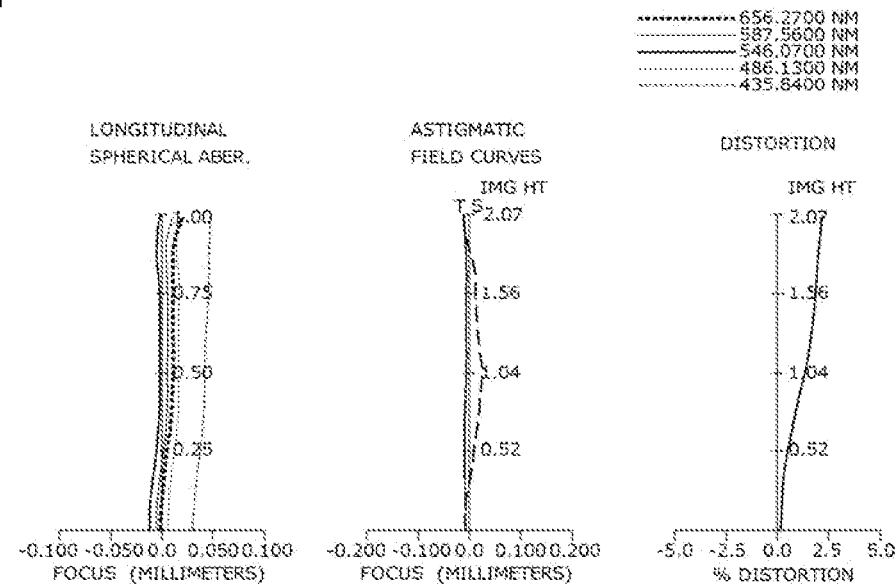

[FIG. 3C]
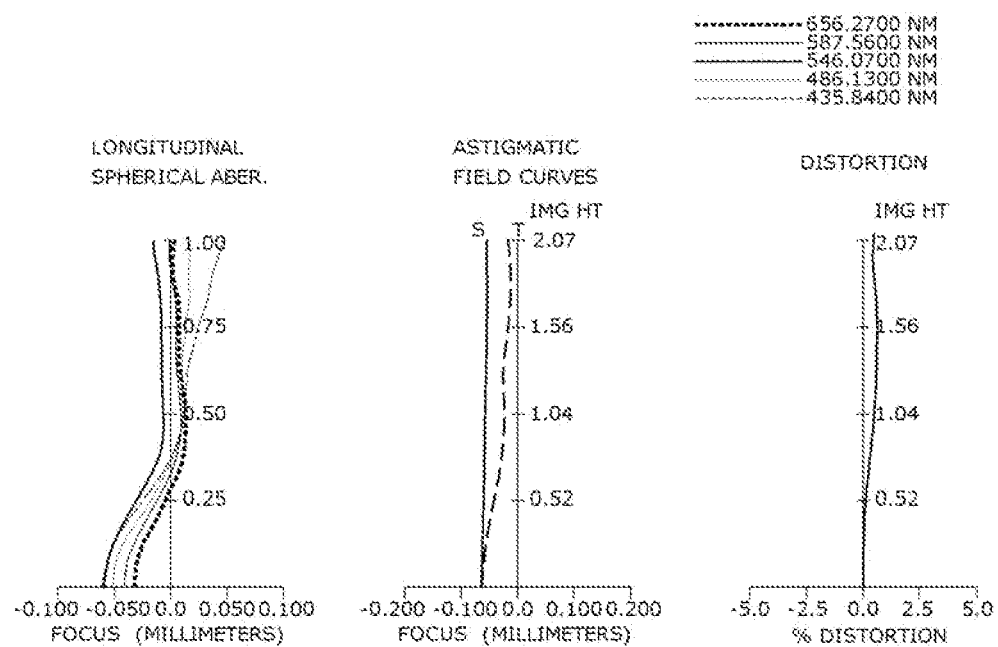

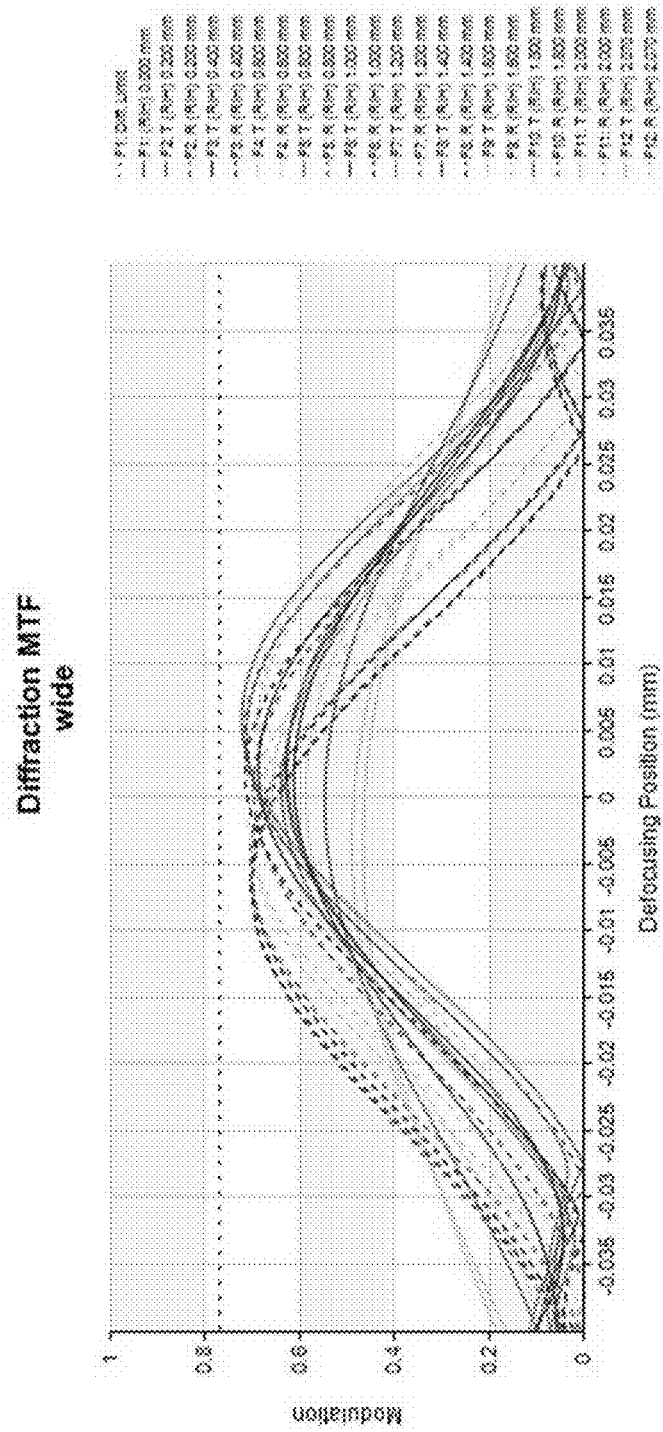
[FIG. 4A]

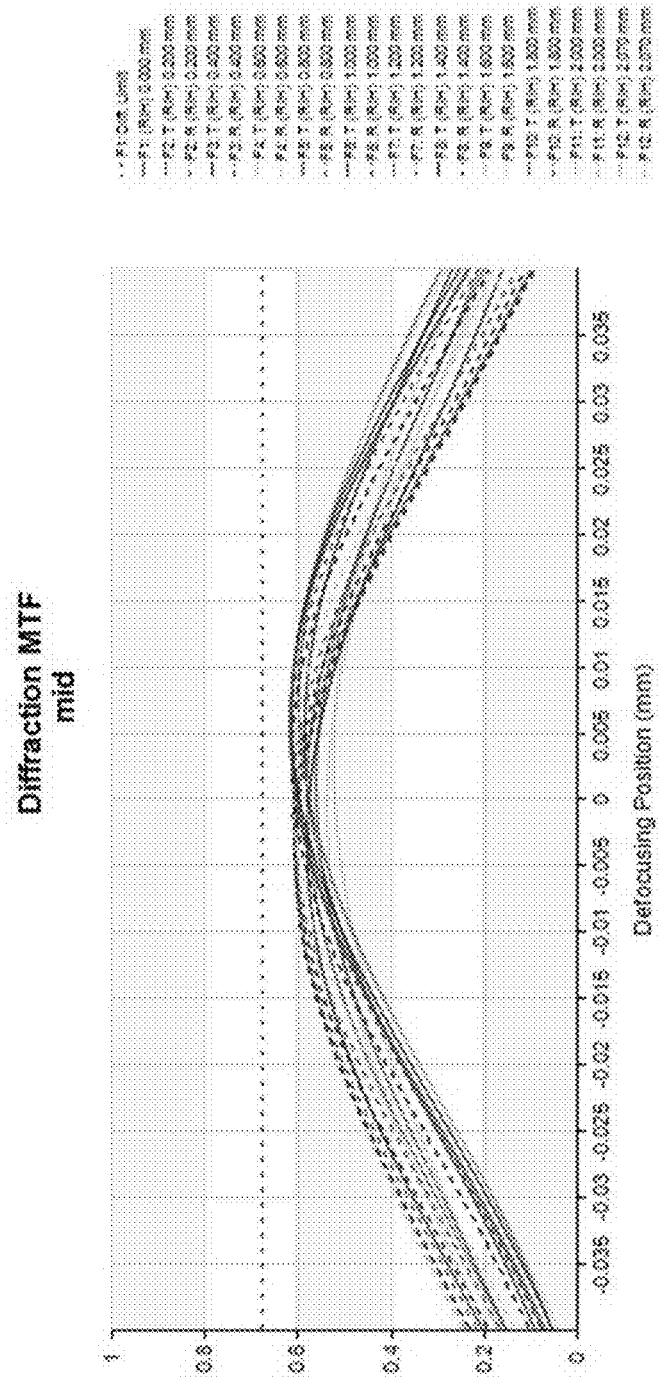
[FIG. 4B]

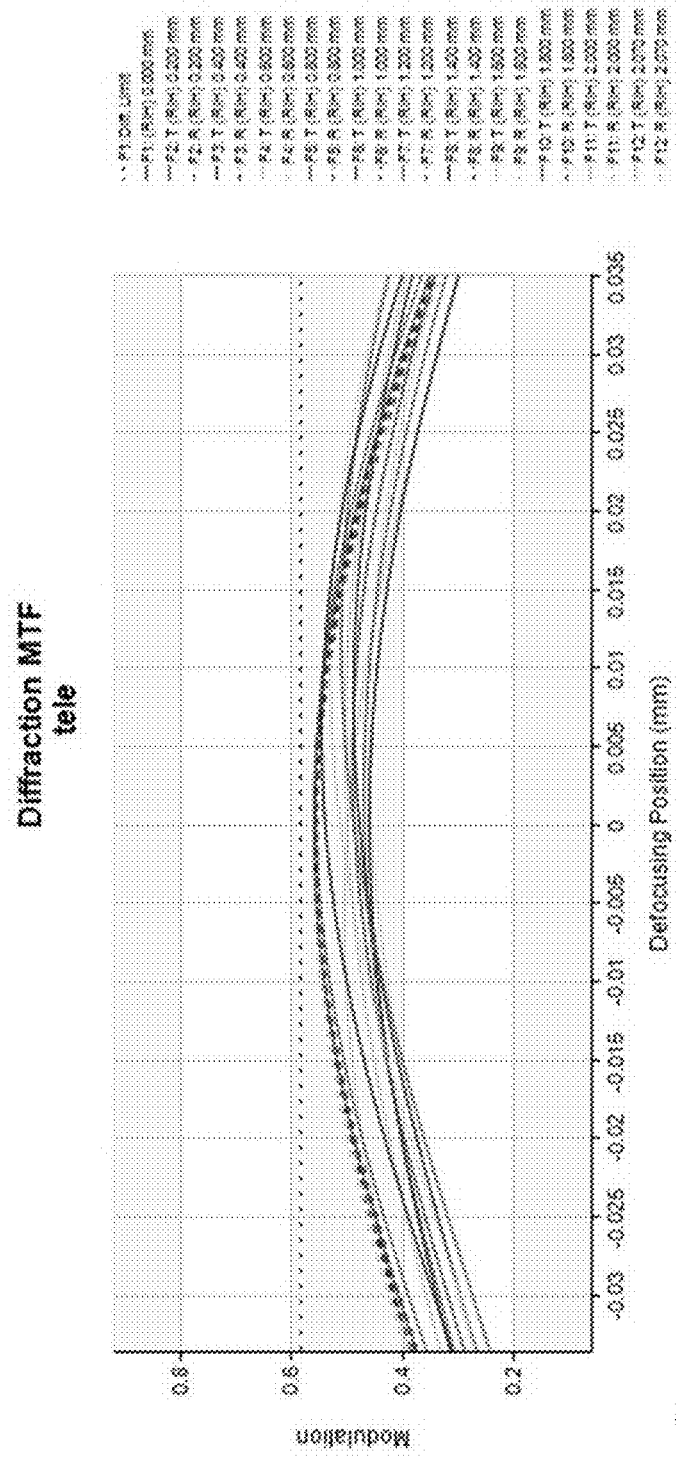
[FIG. 4C]

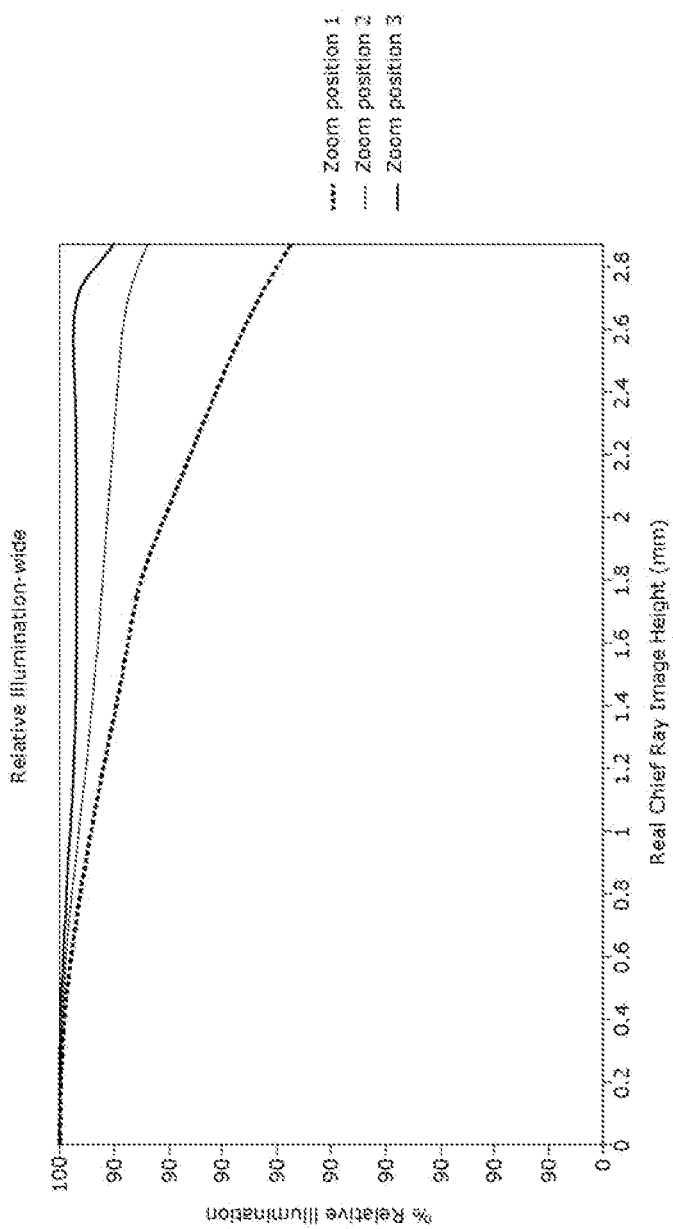
[FIG. 5]

[FIG. 6]
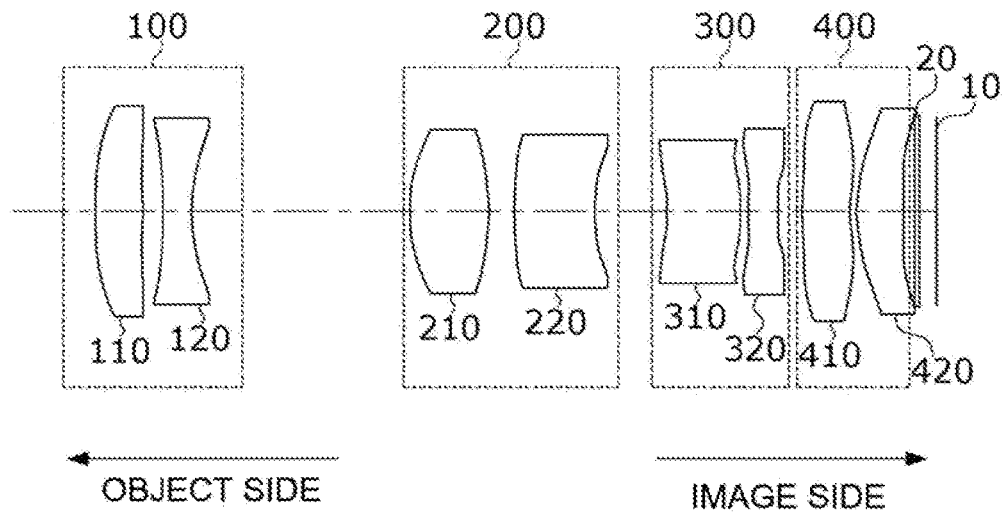
[FIG. 7A]
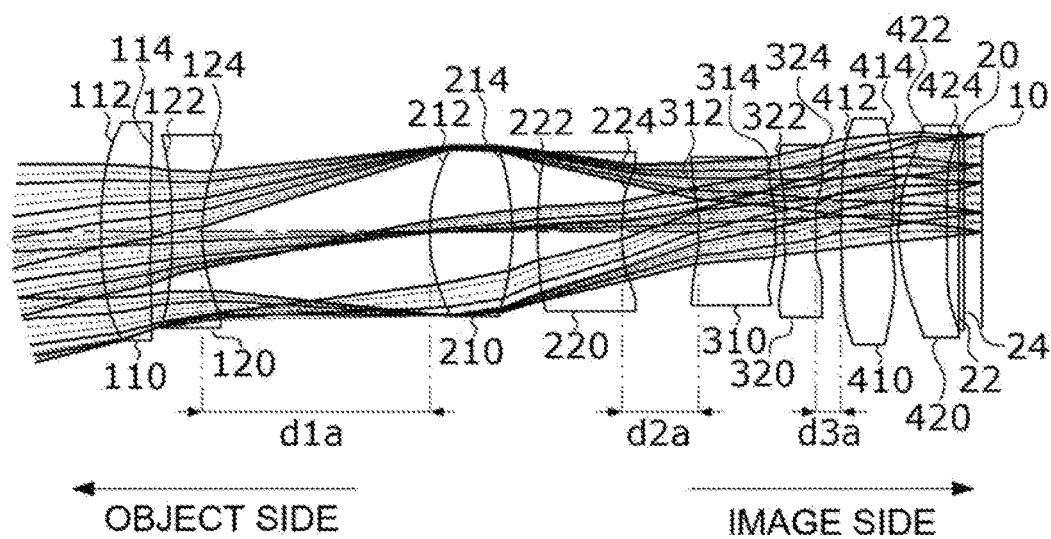

[FIG. 7B]
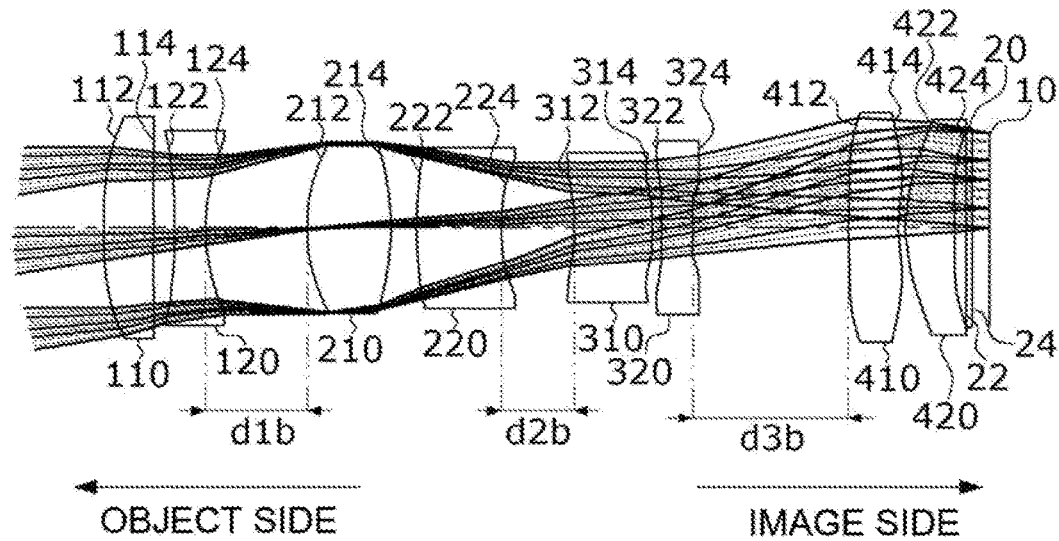
[FIG. 7C]
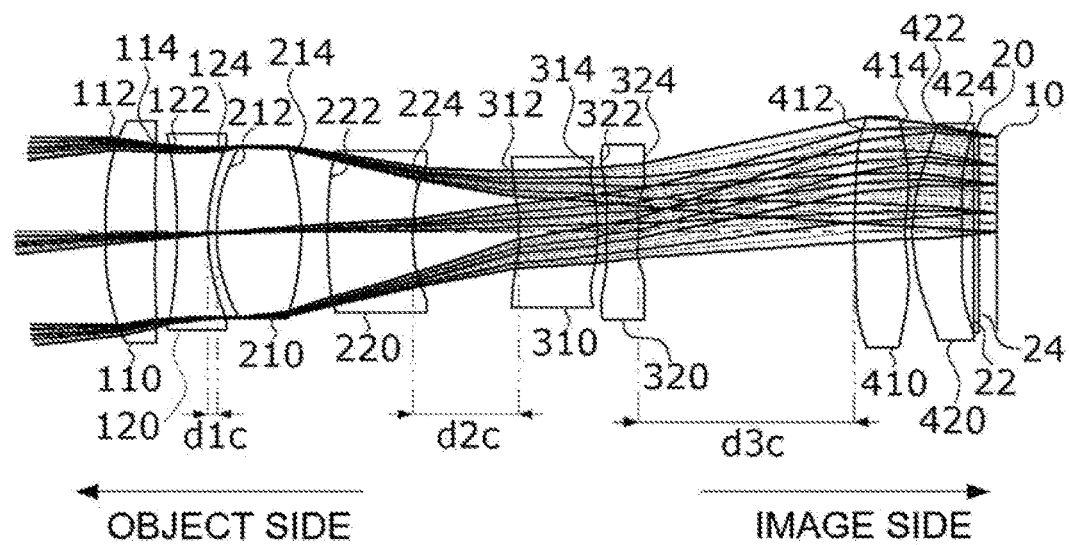

[FIG. 8A]
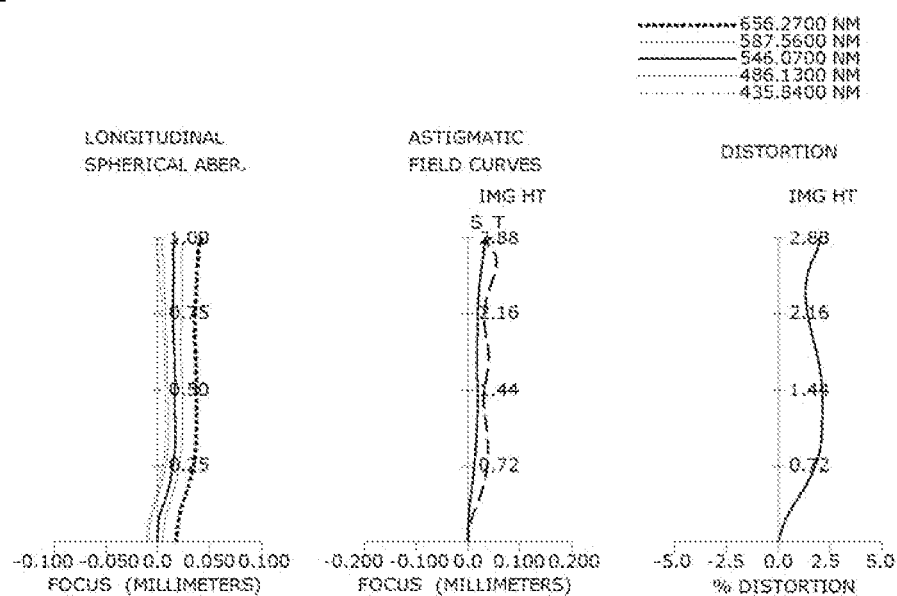
[FIG. 8B]
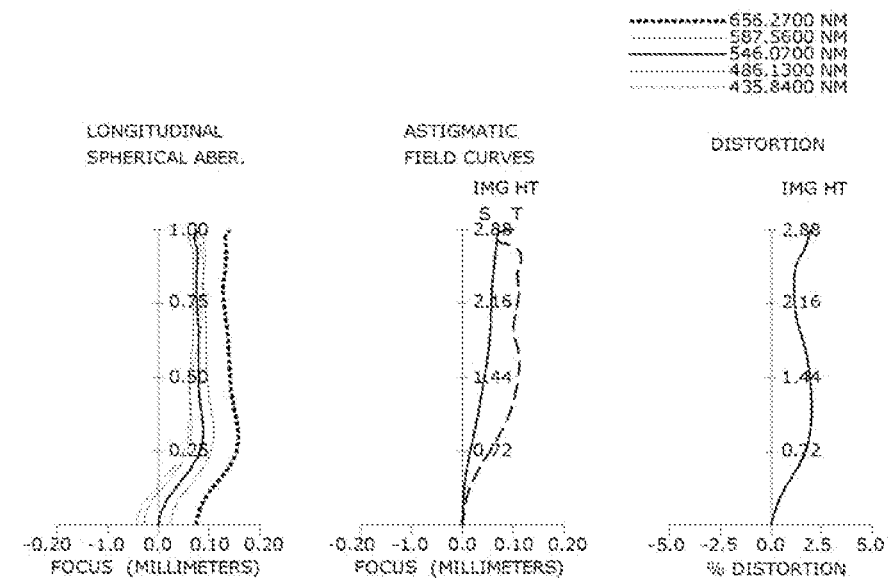

[FIG. 8C]
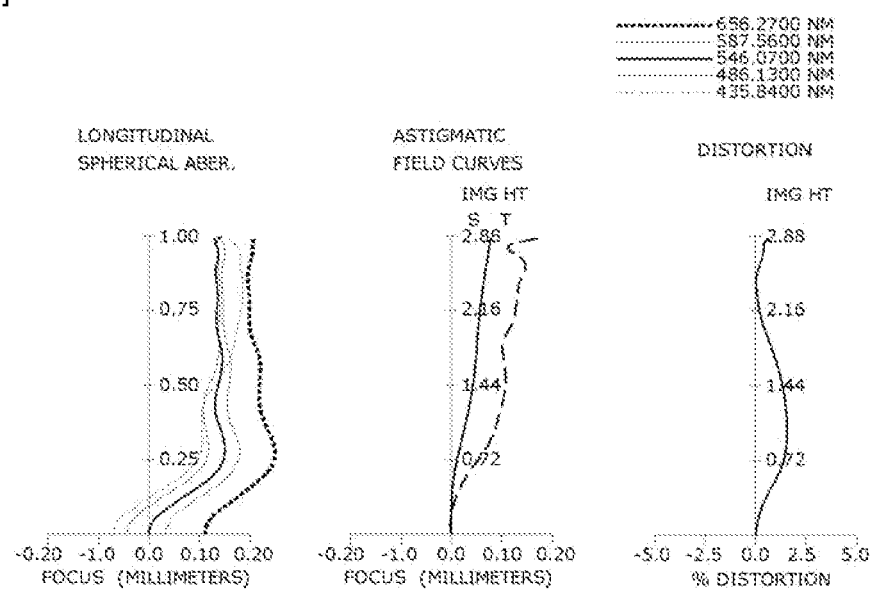

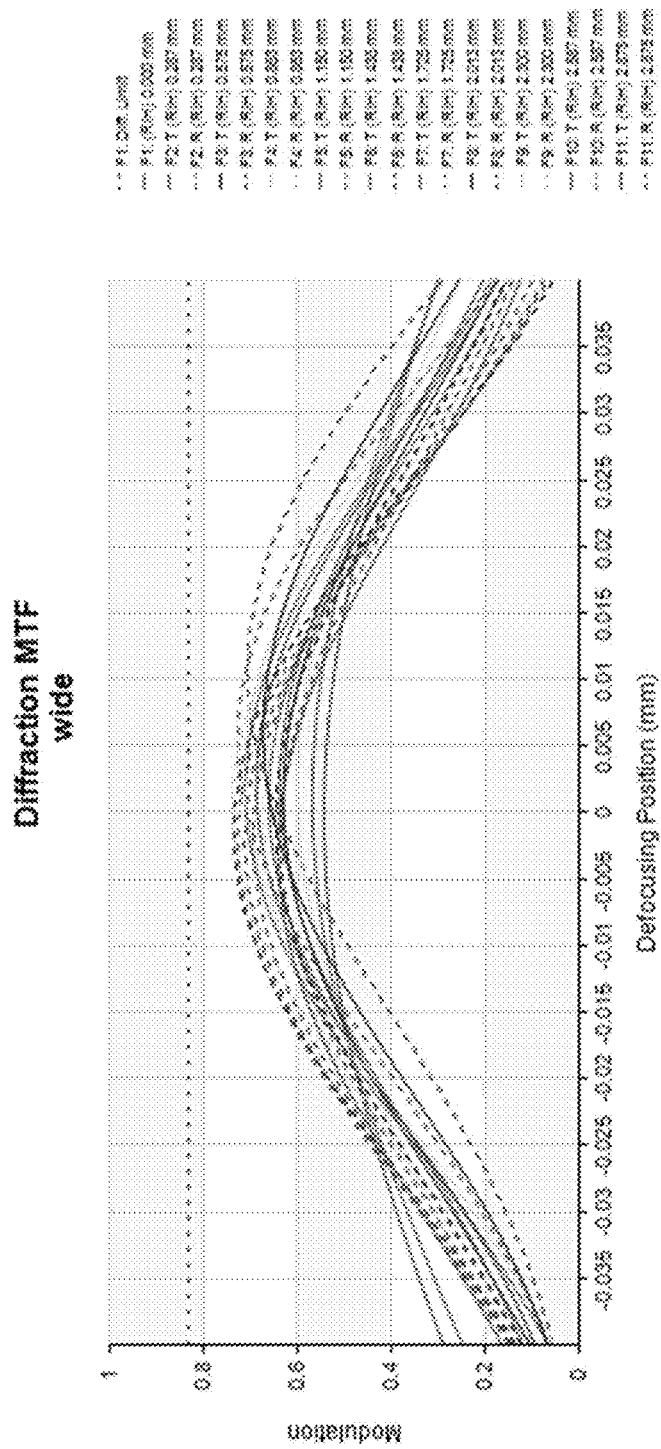
[FIG. 9A]

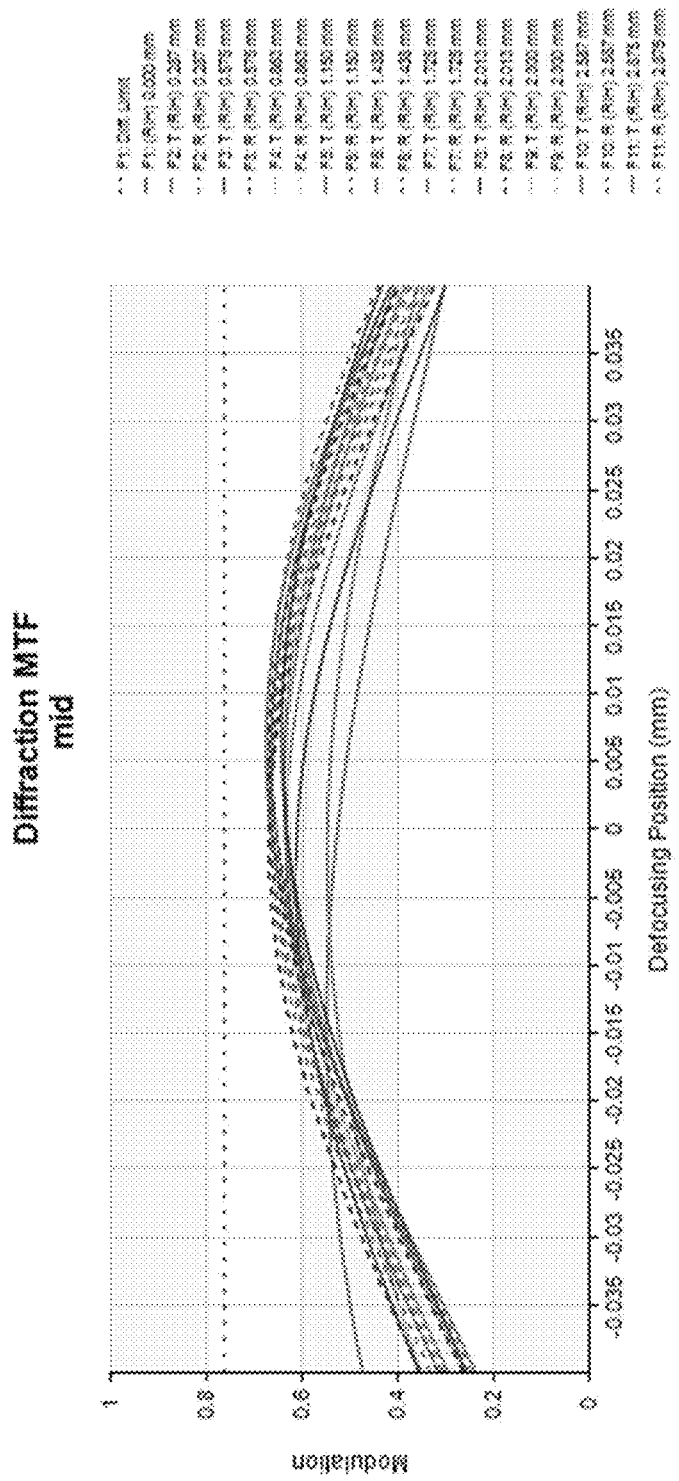
[FIG. 9B]

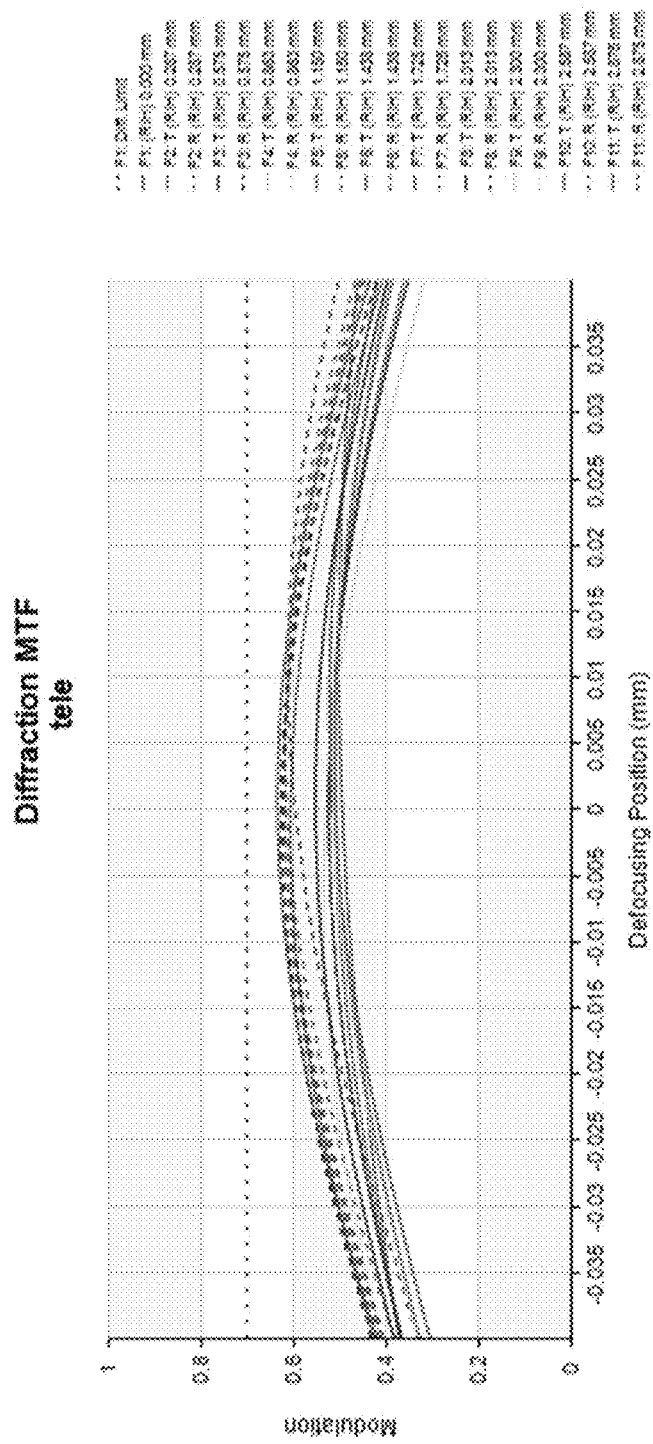
[FIG. 9C]

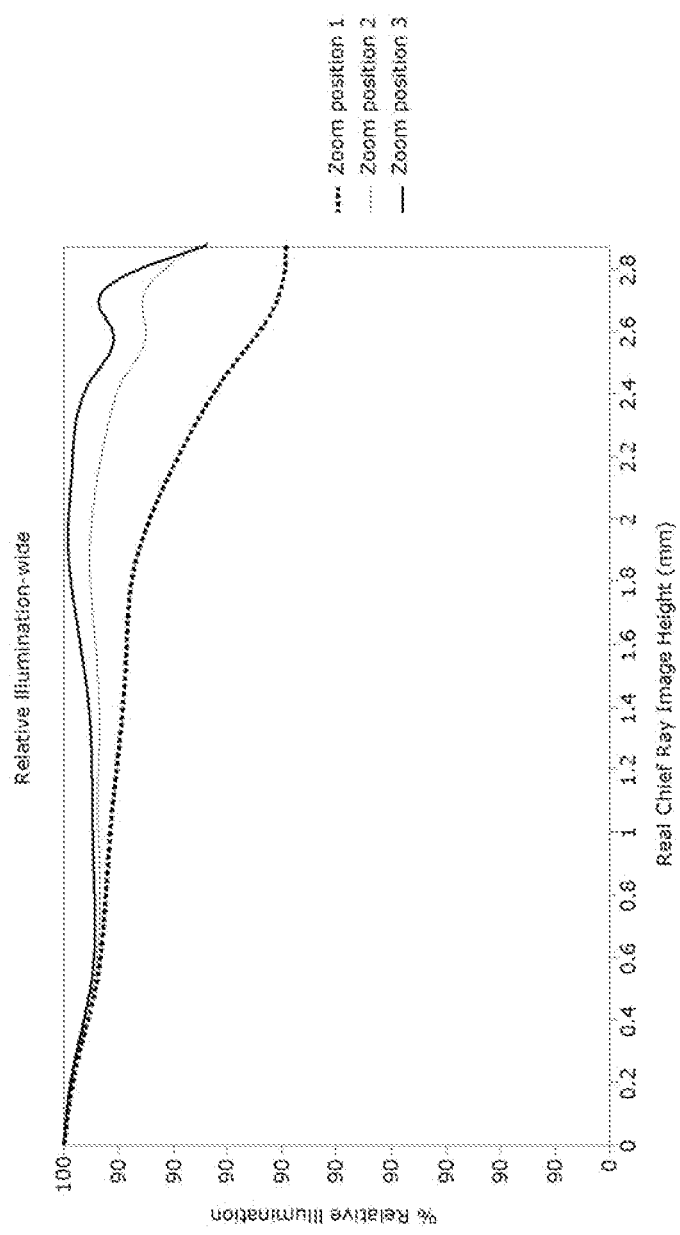
[FIG. 10]

[FIG. 11]
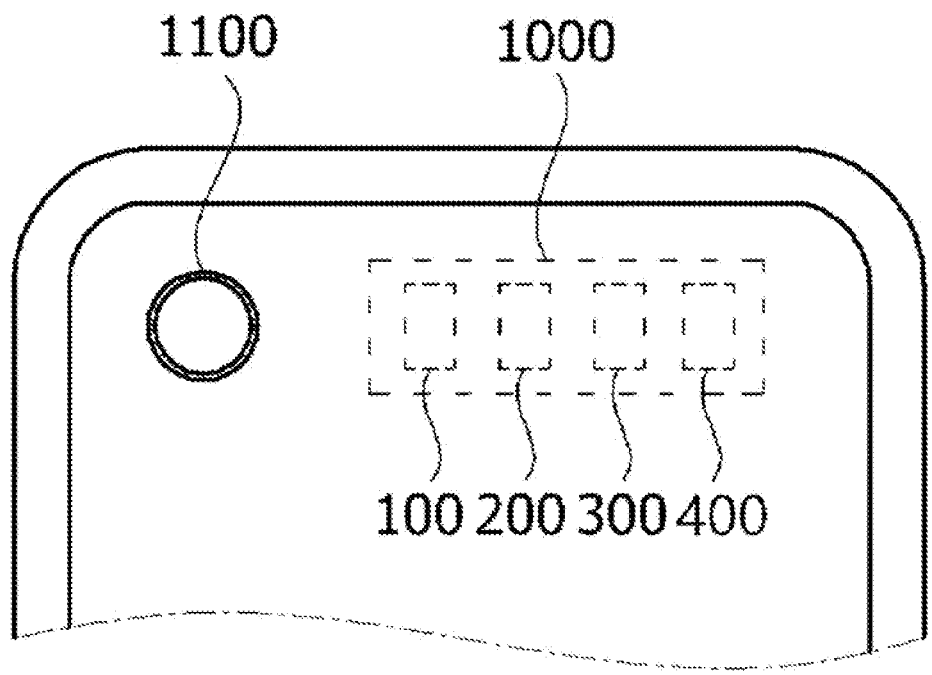

OPTICAL SYSTEM AND CAMERA MODULE INCLUDING SAME

CROSS REFERENCE TO RELATED APPLICATIONS

This application is the National Phase of PCT International Application No. PCT/KR2021/003934, filed on Mar. 30, 2021, which claims priority under 35 U.S.C. 119(a) to Patent Application No. 10-2020-0038383, filed in the Republic of Korea on Mar. 30, 2020, all of which are hereby expressly incorporated by reference into the present application.

TECHNICAL FIELD

An embodiment relates to an optical system and a camera module including the same.

BACKGROUND ART

As the performance of camera modules built in portable terminals develops, an auto-focusing function is also required for the camera modules in the portable terminals.

In order for the camera modules in the portable terminals to have the auto-focusing function, a magnification may be increased by digital processing in a process of converting external light into digital images or digital videos. Accordingly, zooming is possible only at a predetermined magnification such as 1×, 3×, or 5×, and as the magnification increases, a resolution decreases and digital degradation occurs.

Meanwhile, in order for the camera modules in the portable terminals to have the auto-focusing function, a technique for adjusting a distance between a lens and an image sensor by moving the lens has been attempted. However, it is not easy to design an optical system that is movable in a narrow space in the portable terminal.

Technical Problem

The present invention is directed to providing a zoom optical system and a camera module including the same.

The object of the embodiment is not limited thereto, and will also include objects or effects that may be identified from configurations or embodiments, which will be described below.

Technical Solution

A zoom optical system according to an embodiment of the present invention includes a first lens group, a second lens group, a third lens group, and a fourth lens group which are sequentially arranged from an object side to an image side, wherein each of the first lens group to the fourth lens group includes two lenses, the second lens group and the third lens group are movable, and an effective focal length (EFL) in a telephoto is defined by Mathematical Expression below:

$$9.0 < \frac{EFL_{tele}}{H_{imageD}} < 9.5$$

where $EFL_{tele}$ refers to the effective focal length of the zoom optical system in the telephoto, and $H_{imageD}$ refers to a value of half a diagonal length of an image sensor pixel area.

An effective focal length (EFL) in a wide angle may be defined by Mathematical Expression below:

$$3.6 < \frac{EFL_{wide}}{H_{imageD}} < 4.2$$

where $EFL_{wide}$ refers to the effective focal length of the zoom optical system in the wide angle, and $H_{imageD}$ refers to the value of half the diagonal length of the image sensor pixel area.

Upon zooming from a wide angle to a telephoto, a movement stroke of the second lens group may be defined by Mathematical Expression below:

$$3 < \frac{TTL}{STROKE_2} < 4.3$$

where a total track length (TTL) refers to a distance between an image sensor plane and a first plane of the zoom optical system, and $STROKE_2$ refers to a movement stroke of the second lens group.

Upon zooming from a wide angle to a telephoto, a movement stroke of the third lens group may be defined by Mathematical Expression below:

$$3 < \frac{TTL}{STROKE_3} < 4.3$$

where a total track length (TTL) refers to a distance between an image sensor plane and a first plane of the zoom optical system, and $STROKE_3$ refers to a movement stroke of the third lens group.

Each of the first lens group and the second lens group may include at least one glass lens.

At least one of a lens disposed on an image side of the two lenses included in the first lens group or a lens disposed on an object side of the two lenses included in the second lens group may be a glass lens.

The two lenses included in the second lens group may have Abbe's numbers defined by Mathematical Expression below:

$$|ABBE_3 - ABBE_4| > 10$$

where $ABBE_3$ refers to an Abbe's number of a lens disposed on an object side plane of the two lenses included in the second lens group, and $ABBE_4$ refers to an Abbe's number of a lens disposed on an image side plane of the two lenses included in the second lens group.

At least one of the lenses included in the first lens group to the fourth lens group may be a D-cut lens.

Maximum diameters of a plurality of lenses included in the first lens group to the fourth lens group and maximum diameters of a plurality of lenses included in the second lens group and the third lens group may be defined by Mathematical Expression below:

$$1.1 < \frac{APER_{fix}}{APER_{mov}} < 1.4$$

where $APER_{fix}$ may refer to the maximum diameters of the lenses included in the first lens group and the fourth lens group, which are fixed groups, and APER$_{mov}$ may refer to the maximum diameters of the lenses included in the second lens group and the third lens group, which are movable groups.

A lens disposed on an object side of the two lenses included in the first lens group may have a positive refractive power, and a lens disposed on an image side of the two lenses included in the first lens group may have a negative refractive power.

The zoom optical system may further include a right-angle prism disposed at a front end of the first lens group sequentially from the object side to the image side.

A zoom optical system according to an embodiment of the present invention includes a first lens group, a second lens group, a third lens group, and a fourth lens group which are sequentially arranged from an object side to an image side, wherein each of the first lens group to the fourth lens group includes two lenses, the second lens group and the third lens group are movable, and an effective focal length (EFL) in a wide angle is defined by Mathematical Expression below:

$$3.6 < \frac{EFL_{wide}}{H_{imageD}} < 4.2$$

where EFL$_{wide}$ refers to the effective focal length of the zoom optical system in the wide angle, and H$_{imageD}$ refers to a value of half a diagonal length of an image sensor pixel area.

Advantageous Effects

According to an embodiment of the present invention, it is possible to obtain an optical system which can achieve a zoom function at a high magnification as well as a low magnification, and a camera module including the same. An optical system according to an embodiment of the present invention can perform a continuous zoom adjustment, and maintain a high resolution even at a high magnification.

DESCRIPTION OF DRAWINGS

FIG. 1 shows a zoom optical system according to a first embodiment of the present invention.

FIG. 2A is a cross-sectional view in a wide angle of the zoom optical system according to the first embodiment of the present invention.

FIG. 2B is a cross-sectional view in a middle mode of the zoom optical system according to the first embodiment of the present invention.

FIG. 2C is a cross-sectional view in a telephoto of the zoom optical system according to the first embodiment of the present invention.

FIG. 3A is a graph obtained by measuring longitudinal spherical aberration, astigmatic field curves, and distortion for light having wavelengths of 435 nm, 486 nm, 546 nm, 587 nm, and 656 nm in the wide angle of the optical system according to the first embodiment.

FIG. 3B is a graph obtained by measuring longitudinal spherical aberration, astigmatic field curves, and distortion for light having wavelengths of 435 nm, 486 nm, 546 nm, 587 nm, and 656 nm in the middle mode of the optical system according to the first embodiment.

FIG. 3C is a graph obtained by measuring longitudinal spherical aberration, astigmatic field curves, and distortion for light having wavelengths of 435 nm, 486 nm, 546 nm, 587 nm, and 656 nm in the telephoto of the optical system according to the first embodiment.

FIG. 4A is a diffraction modulation transfer function (MTF) graph in the wide angle of the optical system according to the first embodiment.

FIG. 4B is a diffraction MTF graph in the middle mode of the optical system according to the first embodiment.

FIG. 4C is a diffraction MTF graph in the telephoto of the optical system according to the first embodiment.

FIG. 5 is a graph obtained by measuring relative illumination of the zoom optical system according to the first embodiment of the present invention.

FIG. 6 shows a zoom optical system according to a second embodiment of the present invention.

FIG. 7A is a cross-sectional view in a wide angle of the zoom optical system according to the second embodiment of the present invention.

FIG. 7B is a cross-sectional view in a middle mode of the zoom optical system according to the second embodiment of the present invention.

FIG. 7C is a cross-sectional view in a telephoto of the zoom optical system according to the second embodiment of the present invention.

FIG. 8A is a graph obtained by measuring longitudinal spherical aberration, astigmatic field curves, and distortion for light having wavelengths of 435 nm, 486 nm, 546 nm, 587 nm, and 656 nm in the wide angle of the optical system according to the second embodiment.

FIG. 8B is a graph obtained by measuring longitudinal spherical aberration, astigmatic field curves, the distortion for light having wavelengths of 435 nm, 486 nm, 546 nm, 587 nm, and 656 nm in the middle mode of the optical system according to the second embodiment.

FIG. 8C is a graph obtained by measuring longitudinal spherical aberration, astigmatic field curves, and distortion for light having wavelengths of 435 nm, 486 nm, 546 nm, 587 nm, and 656 nm in the telephoto of the optical system according to the second embodiment.

FIG. 9A is a diffraction MTF graph in the wide angle of the optical system according to the second embodiment.

FIG. 9B is a diffraction MTF graph in the middle mode of the optical system according to the second embodiment.

FIG. 9C is a diffraction MTF graph in the telephoto of the optical system according to the second embodiment.

FIG. 10 is a graph obtained by measuring relative illumination of the zoom optical system according to the second embodiment of the present invention.

FIG. 11 shows a part of a portable terminal to which a camera module according to one embodiment of the present invention is applied.

MODES OF THE INVENTION

Hereinafter, exemplary embodiments of the present invention will be described in detail with reference to the accompanying drawings.

However, the technical spirit of the present invention is not limited to some of the described embodiments but may be implemented in various different forms, and one or more of the components may be used by being selectively coupled and substituted without departing from the scope of the technical spirit of the present invention.

In addition, terms (including technical and scientific terms) used in the embodiments of the present invention may be construed as the meaning that may be generally understood by those skilled in the art to which the present invention pertains unless clearly and especially defined and described, and generally used terms such as terms defined in dictionaries may be construed in consideration of the contextual meaning of the related art.

In addition, the terms used in the embodiments of the present invention are to describe the embodiments and are not intended to limit the present invention.

In this specification, the singular form may also include the plural form unless otherwise specified in the phrase, and when it is described as "at least one (or one or more) of A and B, C", it may include one or more of all possible combinations of A, B, and C.

In addition, in describing the components of the embodiment of the present invention, terms such as first, second, A, B, (a), and (b) may be used.

These terms are only intended to distinguish the component from other components, and the essence, sequence, or order of the corresponding components is not limited by the terms.

In addition, when it is described that a component is "connected", "coupled", or "joined" to another component, this may include a case in which the component is not only directly connected, coupled, or joined to another component, but also a case in which the component is "connected", "coupled", or "joined" to another component through other components interposed therebetween.

In addition, when it is described as being formed or disposed on "top (above) or bottom (below)" of each component, the top (above) or bottom (below) includes not only a case in which two components come into direct contact with each other but also a case in which one or more other components are formed or disposed between the two components. In addition, when expressed as "top (above) or bottom (below)", this may also include the meaning of not only an upward direction but also a downward direction with respect to one component. FIG. 1 shows a zoom optical system according to a first embodiment of the present invention.

Referring to FIG. 1, the zoom optical system according to the first embodiment of the present invention includes a first lens group 100, a second lens group 200, a third lens group 300, and a fourth lens group 400 which are sequentially arranged from an object side to an image side. A right-angle prism may be further disposed at a front end of the first lens group 100.

According to the first embodiment of the present invention, the first lens group 100 includes a plurality of lenses. The first lens group 100 may include at least two or more lenses. Since it may be difficult to correct a resolution at a maximum magnification when the first lens group 100 includes one lens and an overall size of the zoom optical system may increase when the first lens group 100 includes three or more lenses, the first lens group 100 may preferably include two lenses 110 and 120.

The first lens group 100 is fixed to an image side. The first lens group 100 is fixed to a plane of a sensor 10. In other words, the plurality of lenses are fixed to the image side. When the first lens group 100 includes two lenses, the two lenses 110 and 120 may be fixed to the image side.

The second lens group 200 includes a plurality of lenses. The second lens group 200 may include at least two lenses. Since it may be difficult to correct a resolution at a maximum magnification when the second lens group 200 includes one lens and an overall size of the zoom optical system may increase when the second lens group 200 includes three or more lenses, the second lens group 200 may preferably include two lenses 210 and 220.

The second lens group 200 is movable. The plurality of lenses included in the second lens group 200 are movable together along a central axis of the lenses. The two lenses 210 and 220 included in the second lens group 200 are movable together along the central axis of the lenses. When the second lens group 200 includes three or more lenses, a size and weight of the second lens group 200 may increase, and driving power may increase upon movement. Accordingly, the second lens group 200 preferably includes the two lenses 210 and 220. A focal length may be continuously adjusted according to the movement of the second lens group 200. A magnification may be continuously adjusted according to the movement of the second lens group 200. Accordingly, the second lens group 200 may function as a zooming group.

The third lens group 300 includes a plurality of lenses. The third lens group 300 the first lens group 300 may include at least two lenses. Since it may be difficult to correct a resolution at a maximum magnification when the third lens group 300 includes one lens and an overall size of the zoom optical system may increase when the third lens group 300 includes three or more lenses, the third lens group 300 may preferably include two lenses 310 and 320.

The third lens group 300 is movable. The plurality of lenses included in the third lens group 300 are movable together along a central axis of the lenses. The two lenses 310 and 320 included in the third lens group 300 are movable together along the central axis of the lenses. When the third lens group 300 includes three or more lenses, a size and weight of the third lens group 300 may increase, and driving power may increase upon movement. Accordingly, the third lens group 300 may include the two lenses 310 and 320. A focus may be adjusted according to the movement of the third lens group 300. The third lens group 300 may function as a focusing group.

The fourth lens group 400 includes a plurality of lenses. The fourth lens group 400 may include at least two lenses. Since it may be difficult to correct a resolution at a maximum magnification when the fourth lens group 400 includes one lens and an overall size of the zoom optical system may increase when the fourth lens group 400 includes three or more lenses, the fourth lens group 400 may preferably include two lenses 410 and 420.

The fourth lens group 400 is fixed to the image side. The fourth lens group 400 is fixed to the plane of the sensor 10. In other words, the plurality of lenses are fixed to the image side. When the fourth lens group 400 includes two lenses, the two lenses 410 and 420 may be fixed to the image side.

According to the first embodiment of the present invention, a filter 20 and the image sensor 10 may be sequentially disposed at a rear end of the fourth lens group 400. At this time, the filter 20 may be an infrared (IR) filter. Accordingly, the filter 20 may block near-infrared rays, for example, light having a wavelength of 700 nm to 1100 nm from light incident into the camera module. In addition, the image sensor 10 may be connected to a printed circuit board by a wire.

The filter 20 may also include a foreign substance prevention filter and the IR filter sequentially arranged from the object side to the image side. When the filter 20 includes the foreign substance prevention filter, it is possible to prevent foreign substances generated in a process in which the third lens group 300 moves from being introduced into the IR filter or the image sensor 10.

A magnification of the zoom optical system may vary according to the movement of the second lens group 200 and the third lens group 300. For example, the magnification of the zoom optical system may be continuously increased or decreased between 3× and 7.5× according to the movement of the second lens group 200 and the third lens group 300. According to the first embodiment, the zoom optical system may have a 3× magnification in the wide angle and may have a 7.5× magnification in the telephoto. Meanwhile, when the magnification is continuously increased or decreased, it may mean that the magnification does not digitally increase or decrease intermittently, but linearly increases or decreases.

Each of the second lens group 200 and the third lens group 300 may independently move. For example, when the zoom optical system moves from the wide angle to the telephoto, a distance between the second lens group 200 and the third lens group 300 may increase from a movement start point (wide angle) to a predetermined point, and then gradually decrease from the predetermined point to a movement end point (telephoto).

An effective focal length (EFL) of the zoom optical system according to the first embodiment of the present invention will be described.

In the zoom optical system, an effective focal length in the telephoto may be expressed by Mathematical Expression 1 below:

$$9.0 < \frac{EFL_{tele}}{H_{imageD}} < 9.5 \quad \text{[Mathematical Expression 1]}$$

where $EFL_{tele}$ refers to an effective focal length of the zoom optical system in the telephoto, and $H_{imageD}$ refers to a value of half a diagonal length of an image sensor pixel area. Units may be [mm]. The image sensor pixel area may refer to an area where pixels which receive light in the image sensor are arranged. The image sensor pixel area may be an area excluding a circuit area where the received light is converted into an electrical signal, a housing portion according to a packaging, and the like from an entire area of the image sensor.

In the zoom optical system, an effective focal length in the wide angle may be expressed by Mathematical Expression 2 below:

$$3.6 < \frac{EFL_{wide}}{H_{imageD}} < 4.2 \quad \text{[Mathematical Expression 2]}$$

where $EFL_{wide}$ refers to an effective focal length of the zoom optical system in the wide angle, and $H_{imageD}$ refers to the value of half the diagonal length of the image sensor pixel area.

A movement stroke of the zoom optical system according to the first embodiment of the present invention will be described. The movement stroke may refer to a distance at which the lens group may be moved by a drive unit.

A movement stroke of the second lens group 200 may be expressed by Mathematical Expression 3 below:

$$3 < \frac{TTL}{STROKE_2} < 4.3 \quad \text{[Mathematical Expression 3]}$$

where a total track length (TTL) may refer to a distance from an image sensor plane to a first plane of the zoom optical system. For example, the TTL may refer to a distance from one plane closest to the object side of the first lens group 100 to an upper plane of the image sensor 10 on which light is incident. In this specification, the TTL may be used interchangeably with a full-length distance. $STROKE_2$ may refer to the movement stroke of the second lens group 200. Units may be [mm].

A movement stroke of the third lens group 300 may be expressed by Mathematical Expression 4 below:

$$3 < \frac{TTL}{STROKE_3} < 4.3 \quad \text{[Mathematical Expression 4]}$$

where the TTL may refer to the distance from the image sensor plane to the first plane of the zoom optical system. $STROKE_3$ may refer to the movement stroke of the third lens group 300. Units may be [mm].

When the movement stroke is large, there is a problem that it is difficult to mount the drive unit in the portable terminal because a size of the drive unit configured to move the second lens group 200 and the third lens group 300 increases. However, it is possible to decrease the size of the drive unit by implementing the movement stroke to ¼ to ⅓ compared to the TTL, thereby miniaturizing the camera module.

An Abbe's number of the zoom optical system according to the first embodiment of the present invention will be described. The Abbe's number may refer to a numerical value of a property related to light dispersion of the lens.

The plurality of lenses included in the second lens group 200 may have different Abbe's numbers. When the second lens group 200 includes two lenses, the Abbe's numbers of two lenses included in the second lens group 200 may be expressed by Mathematical Expression 5 below:

$$|ABBE_3 - ABBE_4| > 10 \quad \text{[Mathematical Expression 5]}$$

where $ABBE_3$ may refer to the Abbe's number of the lens disposed on an object side plane of two lenses included in the second lens group 200, and $ABBE_4$ may refer to the Abbe's number of the lens disposed on an image side plane of two lenses included in the second lens group 200. According to the first embodiment, $ABBE_3$ may refer to the Abbe's number of the third lens 210, and $ABBE_4$ may refer to the Abbe's number of the fourth lens 220.

The zoom optical system according to the first embodiment of the present invention may remove chromatic aberration by disposing two lenses having Abbe's numbers different from each other by a certain value or more in each of the second lens group 200 and the fourth lens group 400.

An aperture of the lens of the zoom optical system according to the first embodiment of the present invention will be described.

According to the first embodiment of the present invention, the apertures of the second lens group 200 and the third lens group 300 may be smaller than the apertures of the first lens group 100 and the fourth lens group 400. This may be expressed by Mathematical Expression 6 below:

$$1.1 < \frac{APER_{fix}}{APER_{mov}} < 1.4 \quad \text{[Mathematical Expression 6]}$$

where, $APER_{fix}$ may refer to a maximum diameter of the lenses included in the first lens group 100 and the fourth lens group 400, which are fixed groups, and $APER_{mov}$ may refer to a maximum diameter of the lenses included in the second lens group 200 and the third lens group 300, which are movable groups. For example, when the diameter of the first lens 110 is the largest among the lenses included in the first lens group 100 and the fourth lens group 400, which are the fixed groups, $APER_{fix}$ may refer to the diameter of the first lens 110. When the diameter of the third lens 210 is the largest among the lenses included in the second lens group 200 and the third lens group 300, which are the movable groups, $APER_{mov}$ may refer to the diameter of the third lens 210.

It is possible to decrease weights of the second lens group 200 and the third lens group 300 by implementing the apertures of the second lens group 200 and the third lens group 300 smaller than those of the first lens group 100 and the fourth lens group 400. Accordingly, it is possible to decrease power consumption when the second lens group 200 and the third lens group 300, which are the movable groups, move.

According to the first embodiment of the present invention, the plurality of lenses 110, 120, 210, 220, 310, 320, 410, and 420 included in the first to fourth lens groups 100 to 400 may be lenses to which a D-cut technique is applied. The plurality of lenses 110, 120, 210, 220, 310, 320, 410, and 420 included in the first to fourth lens groups 100 to 400 may be D-cut lenses having partially cut upper portions and lower portions. At this time, the upper portions and the lower portions of the plurality of lenses 110, 120, 210, 220, 310, 320, 410, and 420 may have partially cut ribs and effective diameters or have only cut ribs without cutting the effective diameters. According to one embodiment, the second lens group 200 and the third lens group may include lenses in which a value obtained by dividing a long axis length of the effective diameter by a short axis length of the effective diameter is 1. In other words, the long axis length of the effective diameter may be the same as the short axis length of the effective diameter. For example, upper portions and lower portions of the fifth lens 220, the sixth lens 310, and the seventh lens 320 may have only the cut ribs without cutting the effective diameters. A circular type lens has a problem in which a volume of the lens increases due to a vertical height, but as in the first embodiment of the present invention, it is possible to decrease the vertical height by applying the D-cut technique to the upper portions and the lower portions of the plurality of lenses 110, 120, 210, 220, 310, 320, 410, and 420, thereby decreasing the volume of the lens.

According to the first embodiment of the present invention, the first lens group 100 may include a plurality of lenses having different refractive powers. The first lens 110 and the second lens 120 included in the first lens group 100 may have different refractive powers. According to the first embodiment, the first lens 110 may have a positive (+) refractive power, and the second lens 120 may have a negative (−) refractive power.

According to the first embodiment of the present invention, each of the first to fourth lens groups 100 to 400 may include a plastic lens. At this time, each of the first lens group 100 and the second lens group 200 may include a glass lens. At least one of the plurality of lenses included in the first lens group 100 and the second lens group 200 may be the glass lens.

According to an embodiment, the second lens 120 disposed on the image side of the lenses included in the first lens group 100 may be the glass lens. According to another embodiment, the third lens 210 disposed on the object side of the lenses included in the second lens group 200 may be the glass lens. According to another embodiment, both the second lens 120 disposed on the image side of the lenses included in the first lens group 100 and the third lens 210 disposed on the object side of the lenses included in the second lens group 200 may be the glass lenses.

FIG. 2A is a cross-sectional view in a wide angle of the zoom optical system according to the first embodiment of the present invention, FIG. 2B is a cross-sectional view in a middle mode of the zoom optical system according to the first embodiment of the present invention, and FIG. 2C is a cross-sectional view in a telephoto of the zoom optical system according to the first embodiment of the present invention.

Tables 1 and 2 below show optical characteristics of the lenses included in the zoom optical system according to the first embodiment of the present invention, and Tables 3 and 4 show conic constants and aspheric coefficients of the lenses included in the zoom optical system according to the first embodiment of the present invention.

TABLE 1

| Lens No. | Lens plane No. | Curvature radius (R, mm) | Thickness (mm) | Material | Refractive index | Abbe's number |
|---|---|---|---|---|---|---|
| First lens | 112 | 11.2473437342775 | 1.11893407672544 | Plastic | 1.679496 | 19.24252 |
|  | 114 | −25.3321228491665 | 0.450035891354176 |  |  |  |
| Second lens | 122 | 17.5712218717361 | 1.427586206 | Glass | 1.68893 | 31.1605 |
|  | 124 | 2.81204906268498 | 4.568275859 (2.407378747/ 0.214137931) |  |  |  |
| Third lens | 212 | 2.9893003584748 | 1.65265366370863 | Plastic | 1.546502 | 56.11613 |
|  | 214 | −3.16765831362804 | 0.2141379309 |  |  |  |
| Fourth lens | 222 | −3.60538229487752 | 1.73238451891378 | Plastic | 1.679496 | 19.24252 |
|  | 224 | −8.48345722809601 | 0.317025559 (0.214137931/ 0.676792894) |  |  |  |
| Fifth lens | 312 | 6.90794492849383 | 1.33016120525487 | Plastic | 1.546502 | 56.11613 |
|  | 314 | 2.90270498039543 | 0.782488188955159 |  |  |  |
| Sixth lens | 322 | 7.95385694888648 | 0.713793103 | Plastic | 1.546502 | 56.11613 |
|  | 324 | 2.42219377334057 | 0.764785328 (3.028570068/ 4.759155921) |  |  |  |

TABLE 1-continued

| Lens No. | Lens plane No. | Curvature radius (R, mm) | Thickness (mm) | Material | Refractive index | Abbe's number |
|---|---|---|---|---|---|---|
| Seventh lens | 412 | −24.2623167623879 | 0.722494633366979 | Plastic | 1.621697 | 25.79985 |
|  | 414 | −6.49976069301166 | 0.2141379309 |  |  |  |
| Eighth lens | 422 | −7.16167700399636 | 1.3806368806132 | Glass | 1.821145 | 24.0583 |
|  | 424 | −2.72160210570333 | 0.214137930900008 |  |  |  |
| Filter |  |  |  | Glass |  |  |
| Sensor |  |  |  |  |  |  |

TABLE 2

| Lens No. | Lens plane No. | Focal length | Shape | Refractive power | Semi-aperture |
|---|---|---|---|---|---|
| First lens | 112 | 11.6066113 | Convex | + | 2.45 |
|  | 114 |  | Concave |  | 2.349369795 |
| Second lens | 122 | −5.021945796 | Convex | − | 2.066728059 |
|  | 124 |  | Convex |  | 1.764342192 |
| Third lens | 132 | 3.109076313 | Convex | + | 1.784482758 |
|  | 134 |  | Concave |  | 1.784482758 |
| Fourth lens | 212 | −10.77590758 | Concave | − | 1.685547108 |
|  | 214 |  | Concave |  | 1.568389848 |
| Fifth lens | 222 | −10.37880742 | Convex | − | 1.522009003 |
|  | 224 |  | Convex |  | 1.337783866 |
| Sixth lens | 312 | −6.677415682 | Convex | − | 1.315357634 |
|  | 314 |  | Concave |  | 1.507402614 |
| Seventh lens | 322 | 14.06130053 | Concave | + | 2.096518844 |
|  | 324 |  | Concave |  | 2.186531498 |
| Eighth lens | 412 | 4.640183154 | Concave | + | 2.332517646 |
|  | 414 |  | Concave |  | 2.333690989 |
| Filter | 22 |  |  |  | 2.176299 |
|  | 24 | 0.3885 |  |  | 2.148564 |
| Sensor |  |  |  |  | 2.07113 |

TABLE 3

| Lens plane No. | Conic constant (K) | A | B | C | D |
|---|---|---|---|---|---|
| 112 | 0 | −1.57E−03 | 5.90E−06 | −4.92E−05 | 3.30E−06 |
| 114 | 0 | −2.37E−03 | −1.82E−04 | −3.85E−06 | 4.77E−06 |
| 122 | 0 | −1.06E−02 | 2.60E−04 | 1.07E−04 | 4.25E−06 |
| 124 | 0 | −2.08E−02 | 7.65E−04 | 1.23E−04 | −3.59E−05 |
| 212 | 0 | −3.33E−03 | −3.83E−04 | −1.57E−04 | −1.37E−06 |
| 214 | 0 | 0.017113028 | −1.01E−03 | −2.87E−05 | 1.17E−05 |
| 222 | 0 | 0.013190863 | 0.000949984 | 4.55E−05 | 6.44E−05 |
| 224 | 0 | 0.007180495 | 1.37E−03 | 4.71E−04 | −2.81E−04 |
| 312 | 0 | −2.97E−04 | −5.30E−04 | 2.91E−04 | −9.65E−06 |
| 314 | 0 | −0.027139264 | −6.19E−04 | −8.53E−04 | 4.41E−04 |
| 322 | 0 | −0.097344614 | 0.009965488 | −4.20E−03 | 9.00E−04 |
| 324 | 0 | −0.093137087 | 2.27E−02 | −5.31E−03 | 7.76E−04 |
| 412 | 0 | −0.021962012 | 0.005962248 | −1.06E−04 | −1.31E−04 |
| 414 | 0 | 0.00723037 | 9.62E−05 | 2.10E−04 | −6.57E−05 |
| 422 | 0 | 0.03258735 | −4.08E−03 | 1.66E−04 | −2.40E−05 |
| 424 | 0 | 0.035097071 | −3.26E−03 | 3.25E−04 | 4.77E−06 |

TABLE 4

| Lens plane No. | E | F | G | H | J |
|---|---|---|---|---|---|
| 112 | 2.68E−07 | −6.35E−08 | 1.05E−09 | 6.04E−11 | 2.37E−11 |
| 114 | −1.32E−07 | −1.10E−07 | 6.82E−11 | 2.49E−09 | −1.60E−10 |
| 122 | −2.41E−06 | −2.89E−07 | 2.13E−08 | 1.74E−08 | −1.79E−09 |
| 124 | −4.01E−06 | 1.13E−06 | −2.61E−08 | −4.82E−09 | −2.43E−13 |
| 212 | 1.96E−06 | −5.36E−07 | −2.64E−07 | −5.32E−08 | 3.22E−10 |
| 214 | −2.79E−06 | −2.63E−06 | −5.56E−08 | 6.80E−08 | −5.90E−10 |
| 222 | 1.57E−07 | 7.93E−07 | 2.93E−07 | −2.40E−09 | 5.24E−11 |
| 224 | 7.06E−05 | −6.50E−06 | −7.83E−09 | −1.77E−09 | −6.11E−10 |
| 312 | 4.35E−06 | 1.04E−07 | 2.37E−08 | −6.60E−09 | −8.75E−19 |
| 314 | −2.75E−06 | −1.82E−06 | −2.51E−16 | −1.48E−17 | −9.33E−19 |
| 322 | 2.82E−05 | −3.26E−15 | −2.26E−16 | −1.46E−17 | −9.32E−19 |
| 324 | −4.97E−05 | −4.89E−15 | −2.35E−16 | −1.46E−17 | −9.32E−19 |
| 412 | 2.20E−06 | −8.22E−07 | −1.72E−08 | −1.52E−08 | −6.04E−19 |
| 414 | −1.29E−05 | 9.18E−06 | −9.15E−07 | −1.55E−08 | −1.07E−18 |
| 422 | 6.58E−06 | −1.18E−06 | 4.42E−07 | −5.18E−08 | 9.06E−10 |
| 424 | −1.26E−05 | 1.86E−06 | 5.90E−08 | −1.05E−08 | 2.68E−10 |

Referring to FIGS. 2A to 2C and Tables 1 to 4, the zoom optical system includes the first lens group 100, the second lens group 200, the third lens group 300, and the fourth lens group 400 which are sequentially arranged from the object side to the image side. The first lens group 100 includes the first lens 110 and the second lens 120 which are sequentially arranged from the object side to the image side. The second lens group 200 includes the third lens 210 and the fourth lens 220 which are sequentially arranged from the object side to the image side. The third lens group 300 includes the fifth lens 310 and the sixth lens 320 which are sequentially arranged from the object side to the image side. The fourth lens group 400 includes the seventh lens 410 and the eighth lens 420 which are sequentially arranged from the object side to the image side.

In Table 1, the thickness (mm) indicates a distance from each lens plane to the next lens plane.

For example, a thickness described on an object side plane 112 of the first lens 110 indicates a distance from the object side plane 112 to an image side plane 114 of the first lens 110. Specifically, the thickness described on the object side plane 112 of the first lens 110 indicates a distance between a curvature center of the object side plane 112 and a curvature center of the image side plane 114 in the first lens 110.

A thickness described on the image side plane 114 of the first lens 110 indicates a distance from the image side plane 114 of the first lens 110 to an object side plane 122 of the second lens 120. Specifically, the thickness described on the image side plane 114 of the first lens 110 indicates a distance between the curvature center of the image side plane 114 of the first lens 110 and a curvature center of the object side plane 122 of the second lens 120.

A thickness described on an image side plane 124 of the second lens 120 indicates a distance from the image side plane 124 of the second lens 120 to an object side plane 212 of the third lens 210. Specifically, the thickness described on the image side plane 124 of the second lens 120 indicates a distance between the curvature center of the image side plane 124 of the second lens 120 and a curvature center of the object side plane 212 of the third lens 210.

At this time, since the second lens group 200 moves in a zooming process from the wide angle to the telephoto, the thickness described on the image side plane 124 of the second lens 120 may vary. The thickness described on the image side plane 124 of the second lens 120 may have a value between the shortest distance and the longest distance. Referring to Table 1, the thickness described on the image side plane 124 of the second lens 120 may have the longest distance (4.5682758592) in the wide angle. The thickness described on the image side plane 124 of the second lens 120 may have a value (2.407378747) between the shortest distance and the longest distance in the middle mode. The thickness described on the image side plane 124 of the second lens 120 may have the shortest distance (0.2141379309) in the telephoto. A thickness described on an image side plane 224 of the fourth lens 220 and a thickness described on an image side plane 324 of the sixth lens 320 are also the same.

Referring to Table 1, it can be seen that an Abbe's number difference value between the third lens 210 and the fourth lens 220 included in the second lens group 200 is 10 or more. Specifically, it can be seen that since the Abbe's number of the third lens 210 is 56.11613 and the Abbe's number of the fourth lens 220 is 19.24252, the Abbe's number difference value between the two lenses is about 37, and thus the difference value is 10 or more.

Referring to Table 1, it can be seen that any one of the first to fourth lenses 110 to 220 included in the first lens group 100 and the second lens group 200 is the glass lens. Specifically, it can be seen that the first lens 110, the third lens 210, and the fourth lens 220 are the plastic lenses, and the second lens 120 is the glass lens.

Referring to Table 2, each plane of the first to eighth lenses 110 to 420 may be implemented in a convex or concave shape.

The first lens 110 may be a lens in which the object side plane 112 is convex to the object side. The first lens 110 may be a lens in which the image side plane 114 is concave to the object side. The second lens 120 may be a lens in which the object side plane 122 is convex to the object side. The second lens 120 may be a lens in which the image side plane 124 is convex to the object side.

The third lens 210 may be a lens in which the object side plane 212 is convex to the object side. The third lens 210 may be a lens in which the image side plane 214 is concave to the object side. The fourth lens 220 may be a lens in which the object side plane 222 is concave to the object side. The fourth lens 220 may be a lens in which the image side plane 224 is concave to the object side.

The fifth lens 310 may be a lens in which the object side plane 312 is convex to the object side. The fifth lens 310 may be a lens in which an image side plane 314 is convex to the object side. The sixth lens 320 may be a lens in which an object side plane 322 is convex to the object side. The sixth lens 320 may be a lens in which the image side plane 324 is concave to the object side.

The seventh lens 410 may be a lens in which an object side plane 412 is concave to the object side. The seventh lens 410 may be a lens in which an image side plane 414 is concave to the object side. The eighth lens 420 may be a lens in which an object side plane 422 is concave to the object side. The eighth lens 420 may be a lens in which an image side plane 424 is concave to the object side.

The first to eighth lenses 110 to 420 may be lenses having positive refractive powers or negative refractive powers. The first lens 110 may have the positive refractive power. The second lens 120 may have the negative refractive power. The third lens 210 may have the positive refractive power. The fourth lens 220 may have the negative refractive power. The fifth lens 310 may have the negative refractive power. The sixth lens 320 may have the negative refractive power. The seventh lens 410 may have the positive refractive power. The eighth lens 420 may have the positive refractive power.

Referring to FIG. 2A, when a distance between the first lens group 100 and the second lens group 200 is d1a, a distance between the second lens group 200 and the third lens group 300 is d2a, and a distance between the third lens group 300 and the fourth lens group 400 is d3a, the zoom optical system may have the wide angle (e.g., 3× magnification).

In FIG. 2B, when the distance between the first lens group 100 and the second lens group 200 is d1b, the distance between the second lens group 200 and the third lens group 300 is d2b, and the distance between the third lens group 300 and the fourth lens group 400 is d3b, the zoom optical system may have the middle mode.

In FIG. 2C, when the distance between the first lens group 100 and the second lens group 200 is d1c, the distance between the second lens group 200 and the third lens group 300 is d2c, and the distance between the third lens group 300 and the fourth lens group 400 is d3c, the zoom optical system may have the telephoto (e.g., 7.5× magnification).

In the process of changing the magnification from the wide angle to the telephoto, the distance between adjacent lens groups may vary. The distance between the first lens group 100 and the second lens group 200 may be changed from d1a to d1c through d1b. At this time, the distance between the first lens group 100 and the second lens group 200 may gradually decrease (d1a>d1b>d1c).

The distance between the second lens group 200 and the third lens group 300 may be changed from d2a to d2c through d2b. At this time, the distance between the second lens group 200 and the third lens group 300 may decrease and then increase again (d2b<d2a<d2c).

The distance between the third lens group 300 and the fourth lens group 400 may be changed from d3a to d3c through d3b. At this time, the distance between the third lens group 300 and the fourth lens group 400 may gradually increase (d3a<d3b<d3c).

As described above, the second lens group 200 and the third lens group 300 may have different moving speeds.

As the second lens group 200 and the third lens group 300 are moved, the magnification of the zoom optical system may be continuously adjusted from 5× magnification to 7.5× magnification.

Next, simulation results of longitudinal spherical aberration, astigmatic field curves, and distortion of the zoom optical system according to the first embodiment of the present invention will described with reference to FIGS. 3A to 3C. The longitudinal spherical aberration represents longitudinal spherical aberration according to each wavelength, the astigmatic field curves represent aberration characteristics of a tangential plane and a sagital plane according to a height of an image plane, and the distortion represents the degree of distortion according to the height of the image plane.

FIG. 3A is a graph obtained by measuring longitudinal spherical aberration, astigmatic field curves, and distortion for light having wavelengths of 435 nm, 486 nm, 546 nm, 587 nm, and 656 nm in the wide angle of the optical system according to the first embodiment.

FIG. 3B is a graph obtained by measuring longitudinal spherical aberration, astigmatic field curves, and distortion for light having wavelengths of 435 nm, 486 nm, 546 nm, 587 nm, and 656 nm in the middle mode of the optical system according to the first embodiment.

FIG. 3C is a graph obtained by measuring longitudinal spherical aberration, astigmatic field curves, and distortion for light having wavelengths of 435 nm, 486 nm, 546 nm, 587 nm, and 656 nm in the telephoto of the optical system according to the first embodiment.

Referring to FIGS. 3A to 3C, it can be seen that the longitudinal spherical aberration is within a range of −0.05 [mm] to 0.05 [mm] from a center to an end of the image sensor regardless of the wavelength. Specifically, it can be seen that the longitudinal spherical aberration in the wide mode is within a range of about −0.1 [mm] to 0.025 [mm], and the longitudinal spherical aberration in the middle mode is within a range of −0.02 [mm] to 0.05 [mm]. It can be seen that although some wavelengths are out of range near the center of the sensor, the longitudinal spherical aberration in the telephoto is within a range of about −0.05 [mm] to 0.05 [mm].

Referring to FIGS. 3A to 3C, it can be seen that the astigmatic field curves are within a range of −0.05 [mm] to 0.02 [mm] from the center to the end of the image sensor regardless of the wavelength. Specifically, it can be seen that the astigmatic field curves in the wide mode are within a range of about −0.01 [mm] to 0.02 [mm], and the astigmatic field curves in the middle mode are within a range of −0.01 [mm] to 0.02 [mm]. It can be seen that the astigmatic field curves in the telephoto are within a range of about −0.05 [mm] to −0.02 [mm].

Referring to FIGS. 3A to 3C, it can be seen that the distortion is within a range of −0.5[%] to 2.5[%] from the center to the end of the image sensor regardless of the wavelength. Specifically, it can be seen that the distortion in the wide mode is within a range of about −0.5[%] to 1.0[%], and the distortion in the middle mode are within a range of 0[%] to 2.5[%]. It can be seen that the astigmatic field curves distortion in the telephoto are within a range of about 0[%] to 0.5[%].

Next, a modulation transfer function (MTF) simulation result of the zoom optical system according to the first embodiment of the present invention will be described with reference to FIGS. 4A to 4C. A modulation transfer function (MTF) refers to one of performance measurement methods of the optical system.

FIG. 4A is a diffraction MTF graph in the wide angle of the optical system according to the first embodiment. FIG. 4B is a diffraction MTF graph in the middle mode of the optical system according to the first embodiment. FIG. 4C is a diffraction MTF graph in the telephoto of the optical system according to the first embodiment.

Referring to FIGS. 4A to 4C, the zoom optical system according to the embodiment of the present invention has a value close to a diffraction limit, which is a limit value, near a defocusing position 0 in each of the wide angle, the middle mode, and the telephoto.

FIG. 5 is a graph obtained by measuring relative illumination of the zoom optical system according to the first embodiment of the present invention. Referring to FIG. 5, it can be seen that the zoom optical system according to the first embodiment of the present invention has a relative illumination value of 50% or more in all of the wide angle (zoom position 1), the middle mode (zoom position 2), and the telephoto (zoom position 3), and has a relative illumination value of 80% or more in the middle mode and the telephoto.

As described through the embodiments, it can be seen that the optical system according to the embodiment of the present invention has excellent aberration characteristics.

FIG. 6 shows a zoom optical system according to a second embodiment of the present invention.

Referring to FIG. 6, the zoom optical system according to the second embodiment of the present invention includes a first lens group 100, a second lens group 200, a third lens group 300, and a fourth lens group 400 which are sequentially arranged from an object side to an image side. A right-angle prism may be further disposed at a front end of the first lens group 100.

According to the second embodiment of the present invention, the first lens group 100 includes a plurality of lenses. The first lens group 100 may include at least two or more lenses. Since it may be difficult to correct a resolution at a maximum magnification when the first lens group 100 includes one lens and an overall size of the zoom optical system may increase when the first lens group 100 includes three or more lenses, the first lens group 100 may preferably include two lenses 110 and 120.

The first lens group 100 is fixed to an image side. The first lens group 100 is fixed to a plane of a sensor 10. In other words, the plurality of lenses are fixed to the image side. When the first lens group 100 includes two lenses, the two lenses 110 and 120 may be fixed to the image side.

The second lens group 200 includes a plurality of lenses. The second lens group 200 may include at least two lenses. Since it may be difficult to correct a resolution at a maximum magnification when the second lens group 200 includes one lens and an overall size of the zoom optical system may increase when the second lens group 200 includes three or more lenses, the second lens group 200 may preferably include two lenses 210 and 220.

The second lens group 200 is movable. The plurality of lenses included in the second lens group 200 are movable together along a central axis of the lenses. The two lenses 210 and 220 included in the second lens group 200 are movable together along the central axis of the lenses. When the second lens group 200 includes three or more lenses, a size and weight of the second lens group 200 may increase, and driving power may increase upon movement. Accordingly, the second lens group 200 preferably includes the two lenses 210 and 220. A focal length may be continuously adjusted according to the movement of the second lens group 200. A magnification may be continuously adjusted according to the movement of the second lens group 200. Accordingly, the second lens group 200 may function as a zooming group.

The third lens group 300 includes a plurality of lenses. The third lens group 300 may include at least two lenses. Since it may be difficult to correct a resolution at a maximum magnification when the third lens group 300 includes one lens and an overall size of the zoom optical system may increase when the third lens group 300 includes three or more lenses, the third lens group 300 may preferably include two lenses 310 and 320.

The third lens group 300 is movable. The plurality of lenses included in the third lens group 300 are movable together along a central axis of the lenses. The two lenses 310 and 320 included in the third lens group 300 are movable together along the central axis of the lenses. When the third lens group 300 includes three or more lenses, a size and weight of the third lens group 300 may increase, and driving power may increase upon movement. Accordingly, the third lens group 300 preferably includes the two lenses 310 and 320. A focus may be adjusted according to the movement of the third lens group 300. The third lens group 300 may function as a focusing group.

The fourth lens group 400 includes a plurality of lenses. The fourth lens group 400 may include at least two lenses. Since it may be difficult to correct a resolution at a maximum magnification when the fourth lens group 400 includes one lens and an overall size of the zoom optical system may increase when the fourth lens group 400 includes three or more lenses, the fourth lens group 400 may preferably include two lenses 410 and 420.

The fourth lens group 400 is fixed to the image side. The fourth lens group 400 is fixed to the plane of the sensor 10. In other words, the plurality of lenses are fixed to the image side. When the fourth lens group 400 includes two lenses, the two lenses 410 and 420 may be fixed to the image side.

According to the second embodiment of the present invention, a filter 20 and the image sensor 10 may be sequentially disposed at a rear end of the fourth lens group 400. At this time, the filter 20 may be an infrared (IR) filter. Accordingly, the filter 20 may block near-infrared rays, for example, light having a wavelength of 700 nm to 1100 nm from light incident into the camera module. In addition, the image sensor 10 may be connected to a printed circuit board by a wire. The filter 20 may also include a foreign substance prevention filter and the IR filter sequentially arranged from the object side to the image side. When the filter 20 includes the foreign substance prevention filter, it is possible to prevent foreign substances generated in a process in which the third lens group 300 moves from being introduced into the IR filter or the image sensor 10.

A magnification of the zoom optical system may vary according to the movement of the second lens group 200 and the third lens group 300. For example, the magnification of the zoom optical system may be continuously increased or decreased between 3× and 7.5× according to the movement of the second lens group 200 and the third lens group 300. According to the second embodiment, the zoom optical system may have a 3× magnification in a wide angle and may have a 7.5× magnification in a telephoto. Meanwhile, when the magnification is continuously increased or decreased, it may mean that the magnification does not digitally increase or decrease intermittently, but linearly increases or decreases.

Each of the second lens group 200 and the third lens group 300 may independently move. For example, when the zoom optical system moves from the wide angle to the telephoto, a distance between the second lens group 200 and the third lens group 300 may increase from a movement start point (wide angle) to a predetermined point, and then gradually decrease from the predetermined point to a movement end point (telephoto).

An effective focal length (EFL) of the zoom optical system according to the second embodiment of the present invention will be described.

In the zoom optical system, an effective focal length in the telephoto may be expressed by Mathematical Expression 7 below:

$$9.0 < \frac{EFL_{tele}}{H_{imageD}} < 9.5 \qquad \text{[Mathematical Expression 7]}$$

where $EFL_{tele}$ refers to an effective focal length of the zoom optical system in the telephoto, and $H_{imageD}$ refers to a value of half a diagonal length of an image sensor pixel area. Units may be [mm].

In the zoom optical system, an effective focal length in the wide angle may be expressed by Mathematical Expression 8 below:

$$3.6 < \frac{EFL_{wide}}{H_{imageD}} < 4.2 \qquad \text{[Mathematical Expression 8]}$$

where $EFL_{wide}$ refers to an effective focal length of the zoom optical system in the wide angle, and $H_{imageD}$ refers to the value of half the diagonal length of the image sensor pixel area.

A movement stroke of the zoom optical system according to the second embodiment of the present invention will be described. The movement stroke may refer to a distance at which the lens group may be moved by a drive unit.

The movement stroke of the second lens group 200 may be expressed by Mathematical Expression 9 below:

$$3 < \frac{TTL}{STROKE_2} < 4.3 \qquad \text{[Mathematical Expression 9]}$$

where a total track length (TTL) may refer to a distance from an image sensor plane to a first plane of the zoom optical system. For example, the TTL may refer to a distance from one plane closest to the object side of the first lens group 100 to an upper plane of the image sensor 10 on which light is incident. In this specification, the TTL may be used interchangeably with a full-length distance. STROKE$_2$ may refer to the movement stroke of the second lens group 200. Units may be [mm].

The movement stroke of the third lens group 300 may be expressed by Mathematical Expression 10 below:

$$3 < \frac{TTL}{STROKE_3} < 4.3 \qquad \text{[Mathematical Expression 10]}$$

where the TTL may refer to the distance from the image sensor plane to the first plane of the zoom optical system. STROKE$_3$ may refer to the movement stroke of the third lens group 300. Units may be [mm]. When the movement stroke is large, there is a problem that it is difficult to mount the drive unit in the portable terminal because a size of the drive unit configured to move the second lens group 200 and the third lens group 300 increases. However, it is possible to decrease the size of the drive unit by implementing the movement stroke to ¼ to ⅓ compared to the TTL, thereby miniaturizing the camera module.

An Abbe's number of the zoom optical system according to the second embodiment of the present invention will be described. The Abbe's number may refer to a numerical value of a property related to light dispersion of the lens.

The plurality of lenses included in the second lens group 200 may have different Abbe's numbers. When the second lens group 200 includes two lenses, the Abbe's number of two lenses included in the second lens group 200 may be expressed by Mathematical Expression 11 below:

$$|ABBE_3 - ABBE_4| > 10 \qquad \text{[Mathematical Expression 11]}$$

where ABBE$_3$ may refer to the Abbe's number of the lens disposed on an object side plane of two lenses included in the second lens group 200, and ABBE$_4$ may refer to the Abbe's number of the lens disposed on an image side plane of two lenses included in the second lens group 200. According to the second embodiment, ABBE$_3$ may refer to an Abbe's number of the third lens 210, and ABBE$_4$ may refer to an Abbe's number of the fourth lens 220.

The zoom optical system according to the second embodiment of the present invention may remove chromatic aberration by disposing two lenses having Abbe's numbers different from each other by a predetermined value or more in each of the second lens group 200 and the fourth lens group 400.

An aperture of the lens of the zoom optical system according to the second embodiment of the present invention will be described.

According to the second embodiment of the present invention, apertures of the second lens group 200 and the third lens group 300 may be smaller than apertures of the first lens group 100 and the fourth lens group 400. This may be expressed by Mathematical Expression 12 below:

$$1.1 < \frac{APER_{fix}}{APER_{mov}} < 1.4 \qquad \text{[Mathematical Expression 12]}$$

where, APER$_{fix}$ may refer to a maximum diameter of the lenses included in the first lens group 100 and the fourth lens group 400, which are fixed groups, and APER$_{mov}$ may refer to a maximum diameter of the lenses included in the second lens group 200 and the third lens group 300, which are movable groups. For example, when the diameter of the first lens 110 is the largest among the lenses included in the first lens group 100 and the fourth lens group 400, which are the fixed groups, APER$_{fix}$ may refer to the diameter of the first lens 110. When the diameter of the third lens 210 is the largest among the lenses included in the second lens group 200 and the third lens group 300, which are the movable groups, APER$_{mov}$ may refer to the diameter of the third lens 210.

It is possible to decrease weights of the second lens group 200 and the third lens group 300 by implementing the apertures of the second lens group 200 and the third lens group 300 smaller than those of the first lens group 100 and the fourth lens group 400. Accordingly, it is possible to decrease power consumption when the second lens group 200 and the third lens group 300, which are the movable groups, move.

According to the second embodiment of the present invention, the plurality of lenses 110, 120, 210, 220, 310, 320, 410, and 420 included in the first to fourth lens groups 100 to 400 may be lenses to which a D-cut technique is applied. The plurality of lenses 110, 120, 210, 220, 310, 320, 410, and 420 included in the first to fourth lens groups 100 to 400 may be D-cut lenses having partially cut upper portions and lower portions. At this time, the upper portions and the lower portions of the plurality of lenses 110, 120, 210, 220, 310, 320, 410, and 420 may have partially cut ribs and effective diameters or have only cut ribs without cutting the effective diameters. According to one embodiment, the second lens group 200 and the third lens group may include lenses in which a value obtained by dividing a long axis length of the effective diameter by a short axis length of the effective diameter is 1. In other words, the long axis length of the effective diameter may be the same as the short axis length of the effective diameter. For example, upper portions and lower portions of the fifth lens 220, the sixth lens 310, and the seventh lens 320 may have only the cut ribs without cutting the effective diameters. A circular type lens has a problem in which a volume of the lens increases due to a vertical height, but as in the second embodiment of the present invention, it is possible to decrease the vertical height by applying the D-cut technique to the upper portions and lower portions of the plurality of lenses 110, 120, 210, 220, 310, 320, 410, and 420, thereby decreasing the volume of the lens.

According to the second embodiment of the present invention, the first lens group 100 may include a plurality of lenses having different refractive powers. The first lens 110 and the second lens 120 included in the first lens group 100 may have different refractive powers. According to the second embodiment, the first lens 110 may have a positive (+) refractive power, and the second lens 120 may have a negative (−) refractive power.

According to the second embodiment of the present invention, each of the first to fourth lens groups 100 to 400 may include a plastic lens. At this time, each of the first lens group 100 and the second lens group 200 may include a glass lens. At least one of the plurality of lenses included in the first lens group 100 and the second lens group 200 may be the glass lens.

According to an embodiment, the second lens 120 disposed on the image side of the lenses included in the first lens group 100 may be the glass lens. According to another embodiment, the third lens 210 disposed on the object side of the lenses included in the second lens group 200 may be the glass lens. According to another embodiment, both the second lens 120 disposed on the image side of the lenses included in the first lens group 100 and the third lens 210 disposed on the object side of the lenses included in the second lens group 200 may be the glass lenses.

FIG. 7A is a cross-sectional view in a wide angle of the zoom optical system according to the second embodiment of the present invention, FIG. 7B is a cross-sectional view in a middle mode of the zoom optical system according to the second embodiment of the present invention, and FIG. 7C is a cross-sectional view in a telephoto of the zoom optical system according to the second embodiment of the present invention.

Tables 5 and 6 below show optical characteristics of the lenses included in the zoom optical system according to the second embodiment of the present invention, and Tables 7 and 8 show conic constants and aspheric coefficients of the lenses included in the zoom optical system according to the second embodiment of the present invention.

TABLE 5

| Lens No. | Lens plane No. | Curvature radius (R, mm) | Thickness (mm) | Material | Refractive index | Abbe's number |
| --- | --- | --- | --- | --- | --- | --- |
| First lens | 112 | 9.195921 | 1.504943618 | Plastic | 1.621697 | 25.7998 |
|  | 114 | −124.47 | 0.618865462 |  |  |  |
| Second lens | 122 | −13.6741 | 0.9 | Plastic | 1.5706 | 37.5496 |
|  | 124 | 5.745781 | 6.8(3.039444812/0.3) |  |  |  |
| Third lens | 212 | 5.273882 | 2.466086193 | Glass | 1.497103 | 81.5596 |
|  | 214 | −7.40268 | 0.8 |  |  |  |
| Fourth lens | 222 | 13.16421 | 2.5 | Plastic | 1.679496 | 19.2425 |
|  | 224 | 6.295382 | 2.208605591(2.125178865/3.058152255) |  |  |  |
| Fifth lens | 312 | −6.10241 | 2.31355082 | Plastic | 1.679496 | 19.2425 |
|  | 314 | −4.25191 | 0.266859249 |  |  |  |
| Sixth lens | 322 | −18.6613 | 0.9 | Plastic | 1.5706 | 37.5496 |
|  | 324 | 3.920266 | 0.772759107(4.61674102/6.423212443) |  |  |  |
| Seventh lens | 412 | 16.51064 | 1.493391983 | Plastic | 1.658019 | 21.5228 |
|  | 414 | 6.15116 | 0.2 |  |  |  |
| Eighth lens | 422 | 5.224501 | 1.463343382 | Glass | 1.851348 | 40.1045 |
|  | 424 | −10.4788 | 0.3 |  |  |  |
| Filter | 22 | 1.00E+18 | 0.21 |  |  |  |
|  | 24 | 1.00E+18 | 0.5 |  |  |  |
| Sensor |  | 1.00E+18 | 0.009 |  |  |  |

TABLE 6

| Lens No. | Lens plane No. | Focal length | Shape | Refractive power | Semi-aperture |
| --- | --- | --- | --- | --- | --- |
| First lens | 112 | 13.83372 | Convex | + | 3.3 |
|  | 114 |  | Concave |  | 3.040664614 |
| Second lens | 122 | −6.97298 | Concave | − | 2.914865392 |
|  | 124 |  | Convex |  | 2.663267527 |
| Third lens | 132 | 6.604808 | Convex | + | 2.55 |
|  | 134 |  | Concave |  | 2.55 |
| Fourth lens | 212 | −20.8222 | Convex | − | 2.42393948 |
|  | 214 |  | Convex |  | 2.032574889 |
| Fifth lens | 222 | 13.70361 | Concave | + | 2.07658539 |
|  | 224 |  | Concave |  | 2.240690242 |
| Sixth lens | 312 | −5.59665 | Concave | − | 2.307293802 |
|  | 314 |  | Convex |  | 2.585585619 |
| Seventh lens | 322 | −15.8027 | Convex | − | 3.40453563 |
|  | 324 |  | Convex |  | 3.347806799 |
| Eighth lens | 412 | 4.25382 | Convex | + | 3.192717643 |
|  | 414 |  | Concave |  | 2.977659535 |
| Filter | 22 |  |  |  | 2.982360669 |
|  | 24 |  |  |  | 2.958767134 |
| Sensor |  |  |  |  | 2.876375019 |

TABLE 7

| Lens plane No. | Conic constant (K) | A | B | C | D |
| --- | --- | --- | --- | --- | --- |
| 112 | −0.16994 | −4.84E−04 | 2.62E−04 | −1.41E−04 | 4.93E−05 |
| 114 | −0.1102 | −4.27E−05 | 4.74E−04 | −2.95E−04 | 1.29E−04 |

TABLE 7-continued

| Lens plane No. | Conic constant (K) | A | B | C | D |
|---|---|---|---|---|---|
| 122 | −3.16628 | 1.42E−04 | 5.29E−05 | 6.43E−06 | 7.29E−06 |
| 124 | −2.09007 | 1.25E−04 | −7.10E−04 | 6.52E−04 | −3.31E−04 |
| 212 | −1.43325 | −1.47E−04 | 8.32E−05 | −1.38E−04 | 9.06E−05 |
| 214 | −4.32845 | 0.000164 | −1.74E−04 | 6.78E−05 | −1.70E−05 |
| 222 | 8.929987 | 0.000107 | 0.000326 | −3.99E−04 | 2.69E−04 |
| 224 | 4.250521 | −0.00015 | −1.89E−03 | 2.79E−03 | −2.52E−03 |
| 312 | −14.524 | 4.22E−03 | 2.60E−03 | −4.70E−03 | 4.22E−03 |
| 314 | −13.8097 | 0.012674 | 5.40E−03 | −6.92E−03 | 3.99E−03 |
| 322 | −45.3519 | −0.00092 | 0.011311 | −1.40E−02 | 8.78E−03 |
| 324 | −17.5545 | −0.00392 | 1.03E−03 | −1.44E−03 | 8.95E−04 |
| 412 | 15.19664 | −0.00531 | 0.000145 | 8.09E−05 | 4.68E−05 |
| 414 | −51.3164 | −0.00461 | −5.05E−03 | 1.94E−03 | −2.98E−04 |
| 422 | −7.72885 | 0.00623 | −6.01E−03 | 3.80E−03 | −1.39E−03 |
| 424 | −99 | 0.042797 | −3.39E−02 | 2.11E−02 | −8.24E−03 |

TABLE 8

| Lens plane No. | E | F | G | H | J |
|---|---|---|---|---|---|
| 112 | −1.02E−05 | 1.30E−06 | −9.89E−08 | 4.17E−09 | −7.54E−11 |
| 114 | −3.43E−05 | 5.46E−06 | −5.10E−07 | 2.60E−08 | −5.64E−10 |
| 122 | −8.92E−06 | 2.60E−06 | −3.49E−07 | 2.30E−08 | −6.08E−10 |
| 124 | 9.87E−05 | −1.83E−05 | 2.08E−06 | −1.33E−07 | 3.67E−09 |
| 212 | −3.44E−05 | 7.89E−06 | −1.08E−06 | 8.14E−08 | −2.60E−09 |
| 214 | 1.71E−06 | 2.92E−07 | −1.18E−07 | 1.44E−08 | −6.42E−10 |
| 222 | −1.06E−04 | 2.58E−05 | −3.85E−06 | 3.22E−07 | −1.17E−08 |
| 224 | 1.44E−03 | −5.10E−04 | 1.09E−04 | −1.28E−05 | 6.23E−07 |
| 312 | −2.27E−03 | 7.62E−04 | −1.56E−04 | 1.80E−05 | −8.91E−07 |
| 314 | −1.32E−03 | 2.43E−04 | −1.85E−05 | −4.50E−07 | 1.04E−07 |
| 322 | −3.39E−03 | 8.10E−04 | −1.15E−04 | 8.80E−06 | −2.81E−07 |
| 324 | −3.41E−04 | 7.96E−05 | −1.10E−05 | 8.25E−07 | −2.59E−08 |
| 412 | −2.26E−05 | 3.91E−06 | −3.41E−07 | 1.51E−08 | −2.71E−10 |
| 414 | 1.72E−05 | 6.05E−07 | −1.23E−07 | 5.06E−09 | −5.52E−11 |
| 422 | 3.22E−04 | −4.77E−05 | 4.32E−06 | −2.16E−07 | 4.58E−09 |
| 424 | 2.03E−03 | −3.18E−04 | 3.05E−05 | −1.63E−06 | 3.74E−08 |

Referring to FIGS. 7A to 7C and Tables 5 to 8, the zoom optical system includes the first lens group 100, the second lens group 200, the third lens group 300, and the fourth lens group 400 which are sequentially arranged from the object side to the image side. The first lens group 100 includes the first lens 110 and the second lens 120 which are sequentially arranged from the object side to the image side. The second lens group 200 includes the third lens 210 and the fourth lens 220 which are sequentially arranged from the object side to the image side. The third lens group 300 includes the fifth lens 310 and the sixth lens 320 which are sequentially arranged from the object side to the image side. The fourth lens group 400 includes the seventh lens 410 and the eighth lens 420 which are sequentially arranged from the object side to the image side.

In Table 5, the thickness (mm) indicates a distance from each lens plane to the next lens plane.

For example, a thickness described on an object side plane 112 of the first lens 110 indicates a distance from the object side plane 112 to an image side plane 114 of the first lens 110. Specifically, the thickness described on the object side plane 112 of the first lens 110 indicates a distance between a curvature center of the object side plane 112 and a curvature center of the image side plane 114 in the first lens 110.

A thickness described on the image side plane 114 of the first lens 110 indicates a distance from the image side plane 114 of the first lens 110 to an object side plane 122 of the second lens 120. Specifically, the thickness described on the image side plane 114 of the first lens 110 indicates a distance between the curvature center of the image side plane 114 of the first lens 110 and a curvature center of the object side plane 122 of the second lens 120.

A thickness described on an image side plane 124 of the second lens 120 indicates a distance from the image side plane 124 of the second lens 120 to an object side plane 212 of the third lens 210. Specifically, the thickness described on the image side plane 124 of the second lens 120 indicates a distance between the curvature center of the image side plane 124 of the second lens 120 and a curvature center of the object side plane 212 of the third lens 210.

At this time, since the second lens group 200 moves in a zooming process from the wide angle to the telephoto, the thickness described on the image side plane 124 of the second lens 120 may vary. The thickness described on the image side plane 124 of the second lens 120 may have a value between the shortest distance and the longest distance. Referring to Table 5, the thickness described on the image side plane 124 of the second lens 120 may have the longest distance (6.8) in the wide angle. The thickness described on the image side plane 124 of the second lens 120 may have a value (3.039444812) between the shortest distance and the longest distance in the middle mode. The thickness described on the image side plane 124 of the second lens 120 may have the shortest distance (0.3) in the telephoto. A thickness described on an image side plane 224 of the fourth lens 220 and a thickness described on an image side plane 324 of the sixth lens 320 are also the same.

Referring to Table 5, it can be seen that an Abbe's number difference value between the third lens 210 and the fourth lens 220 included in the second lens group 200 is 10 or more. Specifically, it can be seen that since the Abbe's number of the third lens 210 is 81.5596 and the Abbe's number of the fourth lens 220 is 19.2425, an Abbe's number difference value between the two lenses is about 62, and thus the difference value is 10 or more.

Referring to Table 5, it can be seen that any one of the first to fourth lenses 110 to 220 included in the first lens group 100 and the second lens group 200 is the glass lens. Specifically, it can be seen that the first lens 110, the second lens 120, and the fourth lens 220 are the plastic lenses, and the third lens 210 is the glass lens.

Referring to Table 6, each plane of the first to eighth lenses 110 to 420 may be implemented in a convex or concave shape.

The first lens 110 may be a lens in which the object side plane 112 is convex to the object side. The first lens 110 may be a lens in which the image side plane 114 is concave to the object side. The second lens 120 may be a lens in which the object side plane 122 is convex to the object side. The second lens 120 may be a lens in which the image side plane 124 is convex to the object side.

The third lens 210 may be a lens in which the object side plane 212 is convex to the object side. The third lens 210 may be a lens in which the image side plane 214 is concave to the object side. The fourth lens 220 may be a lens in which the object side plane 222 is concave to the object side. The fourth lens 220 may be a lens in which the image side plane 224 is convex to the object side.

The fifth lens 310 may be a lens in which the object side plane 312 is convex to the object side. The fifth lens 310 may be a lens in which an image side plane 314 is convex to the object side. The sixth lens 320 may be a lens in which an object side plane 322 is convex to the object side. The sixth lens 320 may be a lens in which the image side plane 324 is concave to the object side.

The seventh lens 410 may be a lens in which an object side plane 412 is concave to the object side. The seventh lens 410 may be a lens in which an image side plane 414 is concave to the object side. The eighth lens 420 may be a lens in which an object side plane 422 is concave to the object side. The eighth lens 420 may be a lens in which the image side plane 424 is convex to the object side.

The first to eighth lenses 110 to 420 may be lenses having positive refractive powers or negative refractive powers. The first lens 110 may have the positive refractive power. The second lens 120 may have the negative refractive power. The third lens 210 may have the positive refractive power. The fourth lens 220 may have the negative refractive power. The fifth lens 310 may have the negative refractive power. The sixth lens 320 may have the negative refractive power. The seventh lens 410 may have the positive refractive power. The eighth lens 420 may have the positive refractive power.

Referring to FIG. 7A, when a distance between the first lens group 100 and the second lens group 200 is d1a, a distance between the second lens group 200 and the third lens group 300 is d2a, and a distance between the third lens group 300 and the fourth lens group 400 is d3a, the zoom optical system may have a wide angle (e.g., 3× magnification).

In FIG. 7B, when the distance between the first lens group 100 and the second lens group 200 is d1b, the distance between the second lens group 200 and the third lens group 300 is d2b, and the distance between the third lens group 300 and the fourth lens group 400 is d3b, the zoom optical system may have a middle mode.

In FIG. 7C, when the distance between the first lens group 100 and the second lens group 200 is d1c, the distance between the second lens group 200 and the third lens group 300 is d2c, and the distance between the third lens group 300 and the fourth lens group 400 is d3c, the zoom optical system may have a telephoto (e.g., 7.5× magnification).

In the process of changing the magnification from the wide angle to the telephoto, the distance between adjacent lens groups may vary.

The distance between the first lens group 100 and the second lens group 200 may be changed from d1a to d1c through d1b. At this time, the distance between the first lens group 100 and the second lens group 200 may gradually decrease (d1a>d1b>d1c).

The distance between the second lens group 200 and the third lens group 300 may be changed from d2a to d2c through d2b. At this time, the distance between the second lens group 200 and the third lens group 300 may decrease and then increase again (d2b<d2a<d2c).

The distance between the third lens group 300 and the fourth lens group 400 may be changed from d3a to d3c through d3b. At this time, the distance between the third lens group 300 and the fourth lens group 400 may gradually increase (d3a<d3b<d3c).

As described above, the second lens group 200 and the third lens group 300 may have different moving speeds.

As the second lens group 200 and the third lens group 300 are moved, the magnification of the zoom optical system may be continuously adjusted from 5× magnification to 7.5× magnification.

Next, simulation results of longitudinal spherical aberration, astigmatic field curves, and distortion of the zoom optical system according to the second embodiment of the present invention will described with reference to FIGS. 8A to 8C. The longitudinal spherical aberration represents longitudinal spherical aberration according to each wavelength, the astigmatic field curves represent aberration characteristics of a tangential plane and a sagital plane according to a height of an image plane, and the distortion represents the degree of distortion according to the height of the image plane.

FIG. 8A is a graph obtained by measuring longitudinal spherical aberration, astigmatic field curves, and distortion for light having wavelengths of 435 nm, 486 nm, 546 nm, 587 nm, and 656 nm in the wide angle of the optical system according to the second embodiment.

FIG. 8B is a graph obtained by measuring longitudinal spherical aberration, astigmatic field curves, and distortion for light having wavelengths of 435 nm, 486 nm, 546 nm, 587 nm, and 656 nm in the middle mode of the optical system according to the second embodiment.

FIG. 8C is a graph obtained by measuring longitudinal spherical aberration, astigmatic field curves, and distortion for light having wavelengths of 435 nm, 486 nm, 546 nm, 587 nm, and 656 nm in the telephoto of the optical system according to the second embodiment.

Referring to FIGS. 8A to 8C, it can be seen that the longitudinal spherical aberration is within a range of −0.07 [mm] to 0.2 [mm] from a center to an end of the image sensor regardless of the wavelength. Specifically, it can be seen that the longitudinal spherical aberration in the wide mode is within a range of about −0.02 [mm] to 0.1 [mm], and the longitudinal spherical aberration is within a range of −0.05 [mm] to 0.2 [mm] in the middle mode. It can be seen that although some wavelengths are out of range near the center of the sensor, the longitudinal spherical aberration in the telephoto is within a range of about −0.07 [mm] to 0.2 [mm].

Referring to FIGS. 8A to 8C, it can be seen that the astigmatic field curves are within a range of 0 [mm] to 0.1 [mm] from the center to the end of the image sensor regardless of the wavelength. Specifically, it can be seen that the astigmatic field curves in the wide mode are within a range of about 0 [mm] to 0.05 [mm], and the astigmatic field curves in the middle mode are within a range of 0 [mm] to 0.1 [mm]. It can be seen that the astigmatic field curves in the telephoto are within a range of about 0 [mm] to 0.1 [mm].

Referring to FIGS. 8A to 8C, it can be seen that the distortion is within a range of 0[%] to 2.5[%] from the center to the end of the image sensor regardless of the wavelength. Specifically, it can be seen that the distortion in the wide mode is within a range of about 0[%] to 2.5[%], and the distortion in the middle mode are within a range of 0[%] to 2.5[%]. It can be seen that the distortion in the telephoto are within a range of about 0[%] to 2[%].

Next, an MTF simulation result of the zoom optical system according to the second embodiment of the present invention will be described with reference to FIGS. 9A to 9C. A modulation transfer function (MTF) refers to one of performance measurement methods of the optical system.

FIG. 9A is a diffraction MTF graph in the wide angle of the optical system according to the second embodiment. FIG. 9B is a diffraction MTF graph in the middle mode of the optical system according to the second embodiment. FIG. 9C is a diffraction MTF graph in the telephoto of the optical system according to the second embodiment.

Referring to FIGS. 9A to 9C, the zoom optical system according to the embodiment of the present invention has a value close to a diffraction limit, which is a limit value, near a defocusing position 0 in each of the wide angle, the middle mode, and the telephoto.

FIG. 10 is a graph obtained by measuring relative illumination of the zoom optical system according to the second embodiment of the present invention.

Referring to FIG. 10, it can be seen that the zoom optical system according to the second embodiment of the present invention has a relative illumination value of 60% or more in all of the wide angle (zoom position 2), the middle mode (zoom position 2), and the telephoto (zoom position 3), and has a relative illumination value of 80% or more in the middle mode and the telephoto.

As described through the embodiments, it can be seen that the optical system according to the embodiment of the present invention has excellent aberration characteristics.

Meanwhile, the zoom optical system according to the embodiment of the present invention may be applied to a camera module. A camera module including a zoom optical system according to one embodiment of the present invention may be built in a portable terminal and applied together with a main camera module. The camera module according to the embodiment of the present invention may include an image sensor, a filter disposed on the image sensor, and a zoom optical system disposed on the filter, and the zoom optical system according to the embodiment of the present invention may include the first lens group 100, the second lens group 200, the third lens group 300, and the fourth lens group 400 which have been described above. The portable terminal in which the camera module including the zoom optical system according to the embodiment of the present invention is built may be a smartphone, a tablet PC, a laptop computer, a personal digital assistant (PDA), or the like. The optical system according to the embodiment of the present invention may be applied to the camera module.

FIG. 11 shows a part of a portable terminal to which a camera module according to one embodiment of the present invention is applied.

Referring to FIG. 11, a camera module including a zoom optical system 1000 according to one embodiment of the present invention may be built in a portable terminal, and applied together with a main camera module 1100.

The zoom optical system 1000 according to the embodiment of the present invention includes the first lens group 100, the second lens group 200, the third lens group 300, and the fourth lens group 400 which have been described above, and the first lens group 100, the second lens group 200, the third lens group 300, and the fourth lens group 400 may be sequentially arranged in a lateral direction of the portable terminal due to thickness restrictions of the portable terminal. To this end, as described above, a right-angle prism may be further disposed at a front end of the first lens group 100. When the zoom optical system is disposed in a thickness direction of the portable terminal, that is, when lens planes of the lenses included in the zoom optical system are disposed in the thickness direction of the portable terminal, it is possible to decrease the thickness of the portable terminal by decreasing diameter sizes of the lenses included in the zoom optical system. Accordingly, the zoom optical system which can continuously adjust the magnification by moving the lens even in the portable terminal can be built-in.

The portable terminal in which the camera module including the zoom optical system according to the embodiment of the present invention is built may be a smartphone, a tablet PC, a laptop computer, a PDA, or the like.

Although the embodiments have been mainly described above, this is merely illustrative and does not limit the present invention, and those skilled in the art to which the present invention pertains will be able to understand that various modifications and applications not exemplified above are possible without departing from the essential characteristics of the embodiments. For example, each component specifically shown in the embodiment may be implemented by modification. In addition, differences related to the modifications and applications should be construed as being included in the scope of the present invention defined in the appended claims.

The invention claimed is:

1. A zoom optical system, comprising:
a first lens group, a second lens group, a third lens group, and a fourth lens group which are sequentially arranged from an object side to an image side,
wherein each of the first lens group to the fourth lens group includes two lenses,
wherein the second lens group and the third lens group are movable,
wherein the first lens group consists of a first lens and a second lens which are sequentially arranged from the object side to the image side,
wherein the second lens has an object side plane convex to the object side and an image side plane convex to the object side,
wherein the object side plane of the second lens has a larger curvature radius than a curvature radius of the image side plane of the second lens, and
wherein an effective focal length (EFL) in a telephoto is defined by Mathematical Expression below:

$$9.0 < \frac{EFL_{tele}}{H_{imageD}} < 9.5$$

where $EFL_{tele}$ refers to the effective focal length of the zoom optical system in the telephoto, and $H_{imageD}$ refers to a value of half a diagonal length of an image sensor pixel area.

2. The zoom optical system of claim 1, wherein an effective focal length (EFL) in a wide angle is defined by Mathematical Expression below:

$$3.6 < \frac{EFL_{wide}}{H_{imageD}} < 4.2$$

where $EFL_{wide}$ refers to the effective focal length of the zoom optical system in the wide angle, and $H_{imageD}$ refers to the value of half the diagonal length of the image sensor pixel area.

3. The zoom optical system of claim 1, wherein upon zooming from a wide angle to a telephoto, a movement stroke of the second lens group is defined by Mathematical Expression below:

$$3 < \frac{TTL}{STROKE_2} < 4.3$$

where a total track length (TTL) refers to a track length at the wide angle end or telephoto end, and $STROKE_2$ refers to a movement stroke of the second lens group from a wide angle to telephoto.

4. The zoom optical system of claim 1, wherein upon zooming from a wide angle to a telephoto, a movement stroke of the third lens group is defined by Mathematical Expression below:

$$3 < \frac{TTL}{STROKE_3} < 4.3$$

where a total track length (TTL) refers to a track length at the wide angle end or telephoto end, and $STROKE_3$ refers to a movement stroke of the third lens group from a wide angle to telephoto.

5. The zoom optical system of claim 1, wherein each of the first lens group and the second lens group includes at least one glass lens.

6. The zoom optical system of claim 5, wherein at least one of a lens disposed on an image side of the two lenses included in the first lens group or a lens disposed on an object side of the two lenses included in the second lens group is a glass lens.

7. The zoom optical system of claim 1, wherein the two lenses included in the second lens group have Abbe's numbers defined by Mathematical Expression below:
|ABBE$_3$−ABBE$_4$|>10
where $ABBE_3$ refers to an Abbe's number of a lens disposed on an object side plane of the two lenses included in the second lens group, and $ABBE_4$ refers to an Abbe's number of a lens disposed on an image side plane of the two lenses included in the second lens group.

8. The zoom optical system of claim 1, wherein the second lens group and the third lens group include lenses in which value obtained by dividing a long axis length of the effective diameter by a short axis length of an effective diameter is 1.

9. The zoom optical system of claim 1, wherein maximum diameters of a plurality of lenses included in the first lens group and the fourth lens group and maximum diameters of a plurality of lenses included in the second lens group and the third lens group are defined by Mathematical Expression below:

$$1.1 < \frac{APER_{fix}}{APER_{mov}} < 1.4$$

where $APER_{fix}$ refers to the maximum diameters of the lenses included in the first lens group and the fourth lens group, which are fixed groups, and $APER_{mov}$ refers to the maximum diameters of the lenses included in the second lens group and the third lens group, which are movable groups.

10. The zoom optical system of claim 1, wherein the second lens group and the third lens group have different moving speeds.

11. The zoom optical system of claim 1, wherein a filter and the image sensor are sequentially disposed at a rear end of the fourth lens group.

12. The zoom optical system of claim 1, wherein the second lens group includes third and fourth lenses, the third lens group includes fifth and sixth lenses, and the fourth lens group includes seventh and eighth lenses, and
wherein the first, third, seventh and eighth lenses have positive refractive power, and wherein the second, fourth, fifth and sixth lenses have negative refractive power.

13. A zoom optical system, comprising:
a first lens group, a second lens group, a third lens group, and a fourth lens group which are sequentially arranged from an object side to an image side,
wherein each of the first lens group to the fourth lens group includes two lenses,
wherein the second lens group and the third lens group are movable,
wherein the first lens group consists of a first lens and a second lens which are sequentially arranged from the object side to the image side,
wherein the second lens has an object side plane convex to the object side and an image side plane convex to the object side,
wherein the object side plane of the second lens has a larger curvature radius than a curvature radius of the image side plane of the second lens, and
wherein an effective focal length (EFL) in a wide angle is defined by Mathematical Expression below:

$$3.6 < \frac{EFL_{wide}}{H_{imageD}} < 4.2$$

where $EFL_{wide}$ refers to the effective focal length of the zoom optical system in the wide angle, and $H_{imageD}$ refers to a value of half a diagonal length of an image sensor pixel area.

14. The zoom optical system of claim 13, wherein each of the first lens group and the second lens group includes at least one glass lens, and wherein at least one of a lens disposed on an image side of the two lenses included in the first lens group or a lens disposed on an object side of the two lenses included in the second lens group is a glass lens.

15. The zoom optical system of claim 13, wherein at least one of the lenses included in the first lens group to the fourth lens group is a D-cut lens.

16. The zoom optical system of claim 1, wherein the first lens has positive refractive power and the second lens has negative refractive power.

* * * * *